United States Patent [19]

Eting et al.

[11] Patent Number: 5,651,056
[45] Date of Patent: Jul. 22, 1997

[54] APPARATUS AND METHODS FOR CONVEYING TELEPHONE NUMBERS AND OTHER INFORMATION VIA COMMUNICATION DEVICES

[76] Inventors: Leon Eting, 352 Agur Street; Yair Gelfer, 367 Pashosh Street, both of Maccabim, Israel, 71908

[21] Appl. No.: 502,148

[22] Filed: Jul. 13, 1995

[51] Int. Cl.$^6$ ........................................... H04M 3/42
[52] U.S. Cl. .................. 379/88; 379/216; 379/354; 379/201; 379/67; 395/2.79; 455/563
[58] Field of Search ........................ 379/58, 59, 67, 379/88, 216, 354, 201; 395/2.79, 2.84

[56] References Cited

U.S. PATENT DOCUMENTS

| | | | |
|---|---|---|---|
| 4,481,382 | 11/1984 | Villa-Real | 379/85 |
| 4,672,667 | 6/1987 | Scott et al. | 381/41 |
| 4,785,408 | 11/1988 | Britton et al. | 379/97 |
| 4,969,193 | 11/1990 | Scott et al. | 381/38 |
| 5,003,576 | 3/1991 | Helferich | 379/88 |
| 5,007,081 | 4/1991 | Schmuckal et al. | 379/354 |
| 5,025,471 | 6/1991 | Scott et al. | 379/43 |
| 5,042,063 | 8/1991 | Sakanishi et al. | 379/88 |
| 5,054,053 | 10/1991 | Sakanishi et al. | 379/63 |
| 5,095,503 | 3/1992 | Kowalski | 379/63 |
| 5,125,022 | 6/1992 | Hunt et al. | 379/88 |
| 5,131,024 | 7/1992 | Pugh et al. | 379/88 |
| 5,148,471 | 9/1992 | Metroka et al. | 379/58 |
| 5,247,705 | 9/1993 | Attig et al. | 455/74 |
| 5,297,183 | 3/1994 | Bareis et al. | 379/81 |
| 5,297,194 | 3/1994 | Hunt et al. | 379/88 |
| 5,303,299 | 4/1994 | Hunt et al. | 379/88 |
| 5,315,649 | 5/1994 | Foster et al. | 379/355 |
| 5,335,261 | 8/1994 | Fujinaka | 379/58 |
| 5,396,542 | 3/1995 | Alger et al. | 379/67 |
| 5,483,579 | 1/1996 | Stogel et al. | 379/88 |

FOREIGN PATENT DOCUMENTS

| | | |
|---|---|---|
| 5 387 69732 | 5/1987 | Australia . |
| 619668 | 10/1994 | European Pat. Off. . |
| 1-155752 | 6/1989 | Japan .......................... 379/70 |
| 2 264 209 | 8/1993 | United Kingdom . |
| WO94/02936 | 2/1994 | WIPO . |

OTHER PUBLICATIONS

"Method and Apparatus for Automatic Contextual Call Return, Calendering, and Address Book Search," IBM Technical Disclosure Bulletin, vol. 37, No. 04A, P 373 Apr. 1994.

"Mechanism to Automate Updaing obsolete Telephone Numbers," IBM Technical Disclosure Bulletin, vol. 37, No. 04A, p. 115 Apr. 1994.

R. Newton, H., "*Beyond Voice Mail*", Computer Telephony, May 1995.

S. Hemmings, David, "*Voice Activated Dialing*", VI Incorporating WT, Dec./Jan. 1995.

T. Hunt, Alan, "*Technology and Applications of Telephone-Network-Based Speech Recognition and Speaker Verification*" undated.

U. Schalk, Dr. Thomas, "*What does the Number 5,297,183 Mean to VCSI Customers?*" undated.

V. Perri, T. et al, "*Network-Based Voice Dialing for Cellular Telephones*" undated.

W. Conway, M. et al, "*Voice Recognition at the Cellular Switch*" undated.

Primary Examiner—Krista M. Zele
Assistant Examiner—Daniel S. Hunter
Attorney, Agent, or Firm—Darby & Darby

[57] ABSTRACT

An accessory device for a telephone system, the device including a spoken telephone number recorder serving a local communicant, the recorder including a spoken telephone number recognizer operative to recognize a telephone number spoken in the course of a telephone conversation between a remote communicant and the local communicant, and a telephone number memory operative to store at least one telephone number received from said telephone number recognizer.

13 Claims, 21 Drawing Sheets

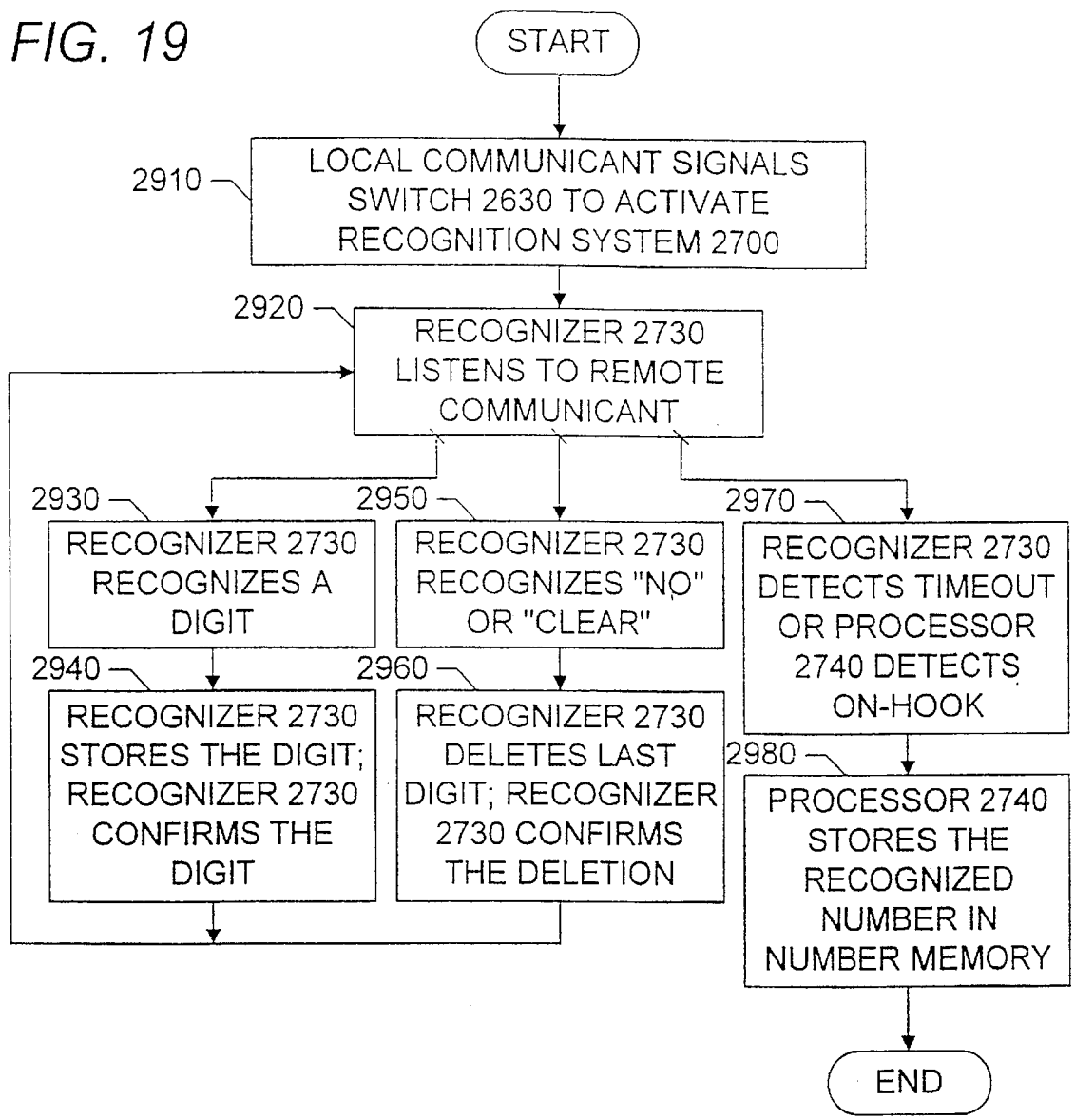

APPARATUS AND METHODS FOR CONVEYING TELEPHONE NUMBERS AND OTHER INFORMATION VIA COMMUNICATION DEVICES

FIELD OF THE INVENTION

The present invention relates to accessories for wireless voice communication systems and for telephone systems.

BACKGROUND OF THE INVENTION

Many types of wireless voice communication systems exist, including cordless telephones, cellular or mobile telephones, dispatching systems and radio systems.

Existing accessories for wireless voice communication systems include the following: the NEC P300 portable phone, the NEC M4700 mobile cellular phone, and the NEC Voice-Activated Dialer, all available from NEC America Inc., Mobile Radio Division, 383 Omni Drive, Richardson, Tex. 75080; the VoiceSelect system available from Brite Voice Systems, Inc.; the Called Voice and Voice Touch systems available from Cellular One of Florida; DSP signal processing chips available from DSP Telecommunications Ltd., Tel-Aviv, Israel; the Voice Organizer and the VCR Voice, available from Voice Powered Technology, Canoga Park, Calif.; the Series 3a computer, available from Psion, Concord, Mass.; a voice-activated car navigation system available from Sanyo, Japan; the WEN 486 SuperNote-Voice notebook PC, available from Wen Technology Corp., Elmsford, N.Y.; the Interactive Communicator, available from Interactive, Inc., Humboldt, S.D.; and various telephone services available from Celcom Technology in Malaysia.

An article entitled "Beyond voice mail" (Newton, H., Computer Telephony, May 1995) suggests ingredients for tomorrow's voice mail, including "A little piece of speech recognition designed specifically to listen for phone numbers being left in your voice mail", which the author terms "a phone number spotter".

Accessories for voice communication are also discussed in "Voice activated dialing" (Hemmings, D., VI Incorporating WT, December/January 1995).

Accessories for voice communication are also described in the following U.S. Patents: U.S. Pat. Nos. 5,125,022; 5,297,183; 5,297,194; 5,303,299; 5,315,649; 4,672,667; 4,969,193; 5,025,471; 5,095,503 to Kowalski; 5,042,063 to Sakanishi et al.; 5,054,053 to Sakanishi et al.; 5,247,705 to Attig et al.; 5,003,576 to Helferich; and 5,148,471 to Metroka et al.

Accessories for voice communication are also described in: Australian Patent Application P 36 08 497.2; UK Patent Application 2 264 209 A; and PCT Patent Application 94/02936.

SUMMARY OF THE INVENTION

An article by Conway, M. et al of Voice Control Systems, entitled "Voice Recognition at the cellular switch: automating 411 call completion" includes a FIG. 1 which illustrates how an ESP (Enhanced Services Platform) is integrated into a 411 (directory service provider) call completion application. A customer dials 411. The call goes through the ESP and then goes off to the operator. The caller gives the operator appropriate information. The line is tapped to capture, by means of voice recognition, information given by a mechanized voice emitted by the directory service provider.

Conway et al does not show or suggest or appreciate the importance of capturing telephone numbers spoken in the course of a telephone conversation with a third party (e.g. a remotely located person, also termed herein "a remote communicant") other than the mechanized voice of a directory service provider. In fact, however, the need very frequently arises to record a telephone number provided orally in the course of a normal telephone conversation with a person other than a directory service operator.

Accessories for wireless voice communication systems are also discussed in the following: "Technology and Applications of Telephone-network-based Speech Recognition and Speaker Verification" (Hunt, A. K., Chief Scientist, Voice Control Systems); and "Network-Based Voice Dialing for Cellular Telephones" (Perri, T., MetroCel Cellular Telephone Company and Schalk, Dr. T. B., Voice Control Systems).

The present invention seeks to provide an improved accessory system for voice communication.

There is thus provided in accordance with a preferred embodiment of the present invention an accessory device for a telephone system, the device including a spoken telephone number recorder serving a local communicant, the recorder including a spoken telephone number recognizer operative to recognize a telephone number spoken in the course of a telephone conversation between a remote communicant and the local communicant, and a telephone number memory operative to store at least one telephone number received from the telephone number recognizer.

Further in accordance with a preferred embodiment of the present invention the accessory device also includes an automatic dialing device operative to retrieve and automatically dial a telephone number stored in the telephone number memory.

Still further in accordance with a preferred embodiment of the present invention wherein the spoken telephone number recorder is incorporated within a cellular telephone instrument.

Additionally in accordance with a preferred embodiment of the present invention the spoken telephone number recorder is incorporated within a fixed telephone instrument.

Moreover in accordance with a preferred embodiment of the present invention the spoken telephone number recorder is incorporated within a cordless telephone instrument.

Further in accordance with a preferred embodiment of the present invention the cellular telephone instrument includes an entirely handheld cellular telephone handset and wherein the spoken telephone number recorder is incorporated within the handset.

Still further in accordance with a preferred embodiment of the present invention the cellular telephone instrument includes a cellular telephone cradle and wherein the spoken telephone number recorder is incorporated within the cradle.

Additionally in accordance with a preferred embodiment of the present invention the telephone system includes a multiplicity of telephone instruments and central network equipment serving the multiplicity of telephone instruments and wherein the spoken telephone number recorder is incorporated within the central network equipment.

Moreover in accordance with a preferred embodiment of the present invention the central network equipment includes a central office switch and the spoken telephone number recorder is incorporated within an adjunct system interfacing with the central office switch.

Further in accordance with a preferred embodiment of the present invention the adjunct system includes a voice mail system.

Still further in accordance with a preferred embodiment of the present invention the adjunct system includes an interactive voice response system.

Additionally in accordance with a preferred embodiment of the present invention the spoken telephone number recognizer is operative in speaker independent mode.

Moreover in accordance with a preferred embodiment of the present invention the spoken telephone number recognizer is operative in speaker dependent mode.

Further in accordance with a preferred embodiment of the present invention the accessory device also includes a speech recorder operative to record a spoken telephone number-identifying title which is stored in association with the telephone number.

There is also provided in accordance with another preferred embodiment of the present invention a method for communicating telephone numbers from a remote communicant to a local communicant via a telephone connection, the method including receiving an oral rendition of a telephone number generated by a remote communicant, recognizing a sequence of digits in an oral repetition of the telephone number generated by the local communicant, and storing the sequence of digits.

Further in accordance with a preferred embodiment of the present invention the method also includes generating the oral rendition and the oral repetition in the course of a telephone conversation between the remote and local communicants.

Still further in accordance with a preferred embodiment of the present invention the method also includes retrieving the sequence of digits and automatically dialing the retrieved telephone number.

Additionally in accordance with a preferred embodiment of the present invention the central network equipment includes fixed central network equipment.

Moreover in accordance with a preferred embodiment of the present invention the central network equipment includes mobile central network equipment.

Further in accordance with a preferred embodiment of the present invention the at least one telephone number includes a plurality of telephone numbers.

There is also provided in accordance with another preferred embodiment of the present invention a wireless voice communications accessory system including a wireless voice communication device, a spoken alphanumeric information recorder including a spoken alphanumeric information recognizer operative to recognize alphanumeric information spoken in the course of a wireless communication session between two human communicants, and an alphanumeric information memory operative to store alphanumeric information received from the recognizer.

There is also provided in accordance with another preferred embodiment of the present invention a method for communicating alphanumeric information from a remote communicant to a local communicant, the method including receiving an oral rendition of alphanumeric information generated by a remote communicant, recognizing a sequence of alphanumeric data elements in an oral repetition of the alphanumeric information generated by the local communicant, and storing the sequence of alphanumeric data elements.

Further in accordance with a preferred embodiment of the present invention the accessory device also includes a spoken telephone number confirmation device operative to confirm the spoken telephone number.

There is also provided in accordance with another preferred embodiment of the present invention a telephone communication method including automatically recognizing at least one telephone number spoken in the course of a telephone conversation with a remote communicant, and storing the at least one recognized telephone number.

Further in accordance with a preferred embodiment of the present invention the method also includes automatically dialing the stored recognized telephone number.

Still further in accordance with a preferred embodiment of the present invention the wireless voice communication device includes a non-telephone wireless voice communications device.

Additionally in accordance with a preferred embodiment of the present invention wherein the non-telephone wireless voice communication device includes a dispatch system communication device.

Moreover in accordance with a preferred embodiment of the present invention the accessory system also includes a spoken alphanumeric information confirmation device operative to confirm the spoken alphanumeric information.

Further in accordance with a preferred embodiment of the present invention the central network equipment includes a central office switch and the spoken telephone number recorder is incorporated within the central office switch.

BRIEF DESCRIPTION OF THE DRAWINGS

FIG. 19 is a simplified flowchart illustration of a preferred method for recognition of spoken telephone numbers in the course of a telephone conversation.

DETAILED DESCRIPTION OF A PREFERRED EMBODIMENT

Figure 1:
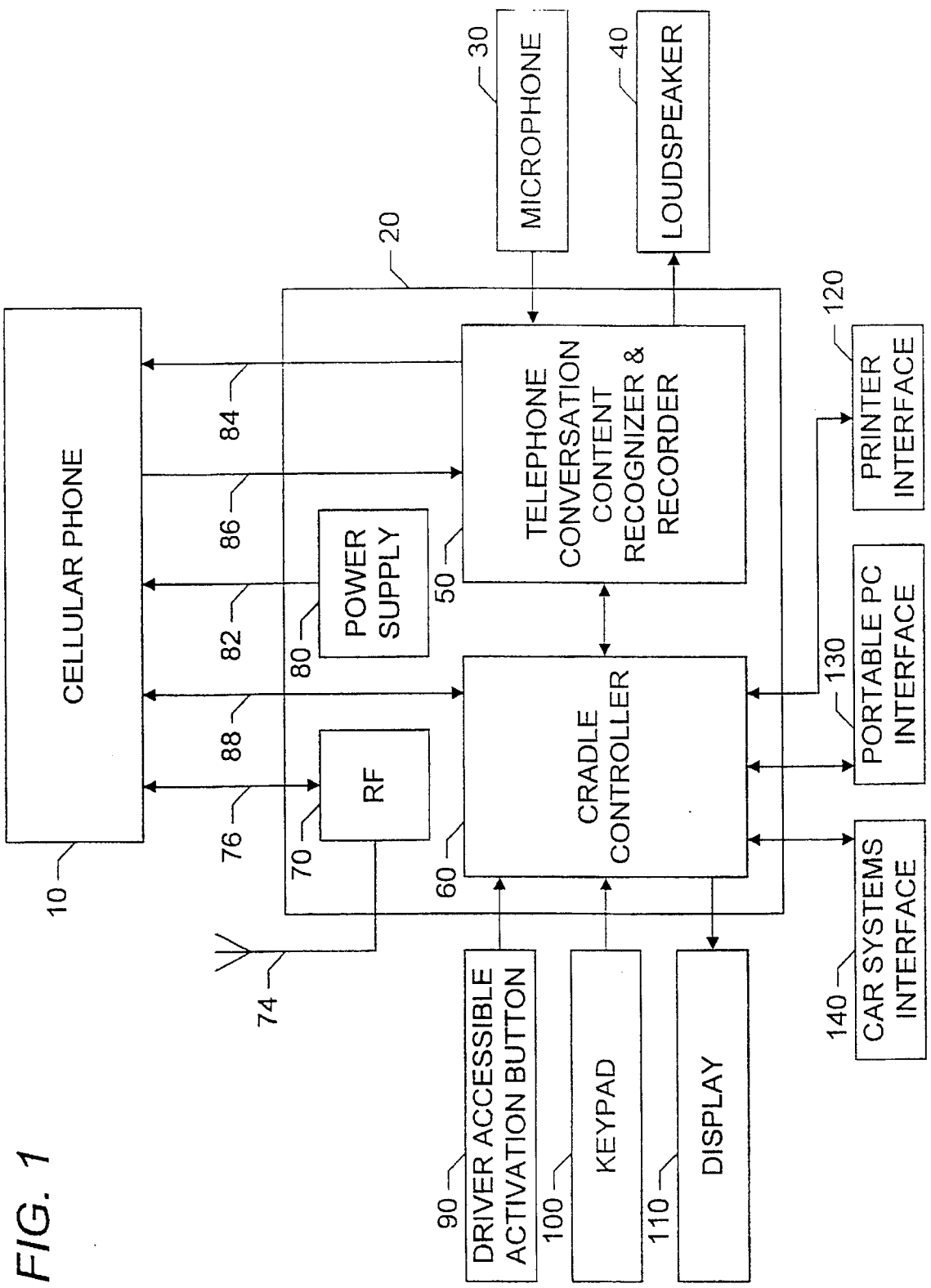
FIG. 1 is a simplified block diagram of a multifunctional cradle or adapter, constructed and operative in accordance with a preferred embodiment of the present invention and associated with a cellular or mobile telephone.

FIG. 1 is a simplified functional block diagram of a multifunctional cradle or adapter, constructed and operative in accordance with a preferred embodiment of the present invention and associated with a cellular or mobile telephone. The cradle or adapter is preferably operative to perform at least the first two of the following functions and preferably three or more of the following functions:

a. Recognizes at least one telephone number and preferably more than one telephone number spoken in the course of a telephone conversation between a first person, termed herein the "remote communicant" and a second person, termed herein "the local communicant". Recognition of the telephone number/s may be either speaker dependent or speaker independent. Preferably, the apparatus of FIG. 1 is also operative to confirm a spoken telephone number by reproducing the recognized telephone number;

b. Stores at least one of the recognized telephone numbers;

c. Retrieves at least one telephone number and automatically dials the retrieved number;

d. Generates a digital or other representation of a spoken telephone number identifying title and stores the title in association with a telephone number to which it corresponds; and e. Functions as an answering machine.

The apparatus of FIG. 1 comprises a cellular or mobile telephone 10 and a multifunctional cradle or adapter 20 operatively associated therewith which is typically mounted in a vehicle. The multifunctional cradle or adapter 20 is also preferably operatively associated with at least one hands-free microphone 30 and at least one loudspeaker 40.

The multifunctional cradle or adapter 20 preferably comprises a telephone conversation content recognizer and recorder 50, a cradle controller 60, a radio frequency (RF) unit 70 and a power supply 80. The RF unit 70 couples the antenna (not shown) of cellular or mobile telephone 10 to a vehicle-mounted antenna 74, via an RF connection 76, providing improved radio performance. The power supply 80 is preferably fed by the car's battery (not shown) and supplies power to the telephone 10 via power connections 82 for powering the telephone 10 and charging the telephone's battery.

Other connections between cellular or mobile telephone 10 and multifunctional cradle 20 include an audio transmit line 84, an audio receive line 86 and a bidirectional control bus 88.

The telephone conversation content recognizer and recorder 50 is described in detail below with reference to FIG. 2. The cradle controller 60 is described in detail below with reference to FIG. 3 and is preferably operatively associated with one, some or all of the following components:

a. a driver-accessible activation button 90 for "waking up" the cradle 20, which may, for example, be mounted on the steering wheel of the vehicle or in the vicinity thereof, such as on the dashboard, such that a driver can access the button 90 without removing his hands from the wheel;

b. a small alphanumeric keypad 100 used for applying the cradle controller user commands, c. a display 110 such as an LCD or fluorescent standard display, for displaying menu prompts and status information to the user, d. a printer interface 120 interfacing with a printer (not shown), e. a portable PC interface 130 interfacing with a portable PC (not shown), and f. a car systems interface 140 interfacing with one or more car systems (not shown) such as the car's radio control.

Figure 2A:
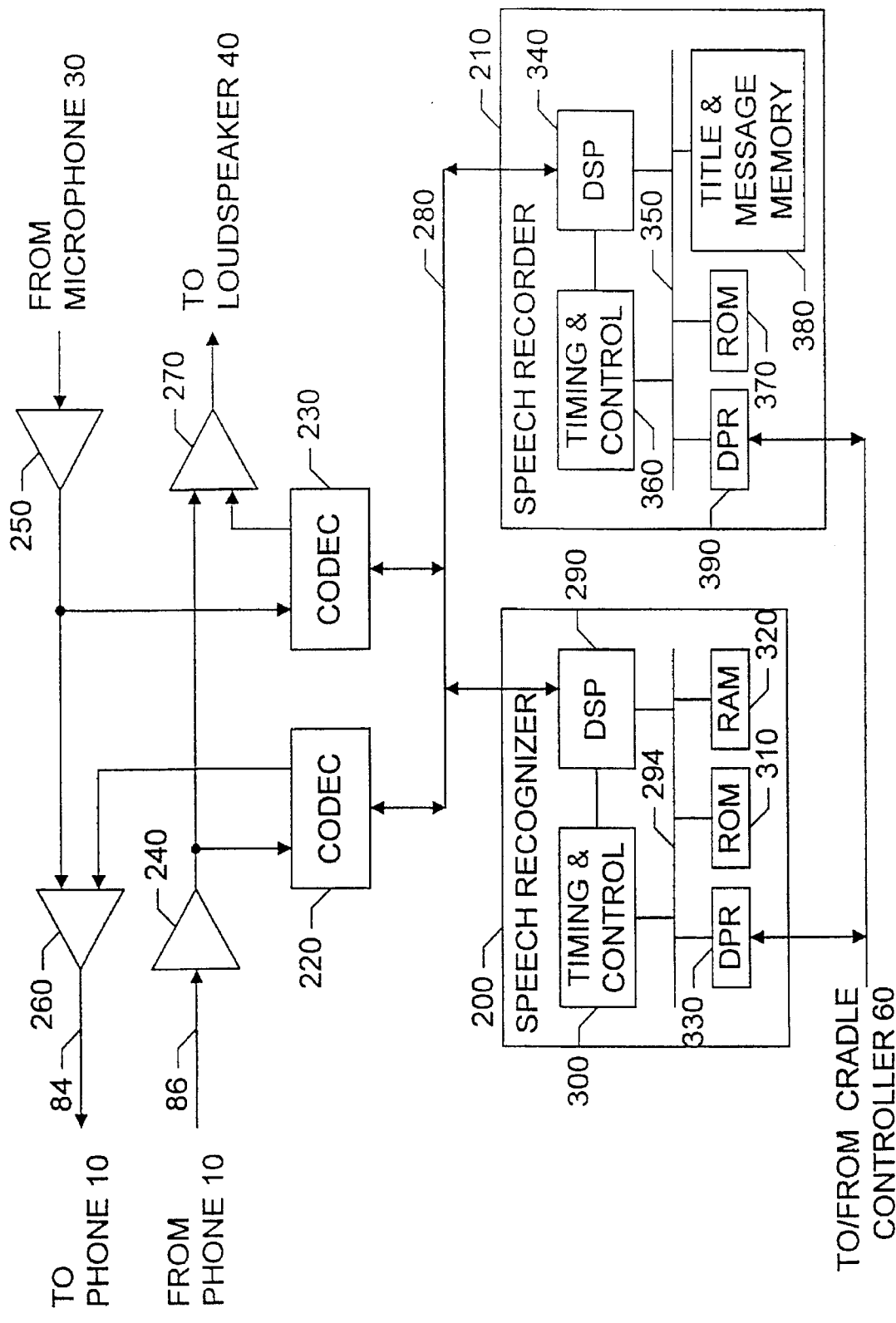
FIG. 2A is a simplified block diagram of the telephone conversation content recognizer and recorder of FIG. 1.

FIG. 2A is a simplified block diagram of the telephone conversation content recognizer and recorder 50. The recognizer and recorder 50 preferably includes a speech recognizer 200, a speech recorder 210, a first coder/decoder (CODEC) 220, a second coder/decoder 230, amplifiers 240 and 250, mixer-amplifiers 260 and 270, and a bidirectional digital bus 280 which includes data, direction, clock and synchronization wires.

Figure 2B:
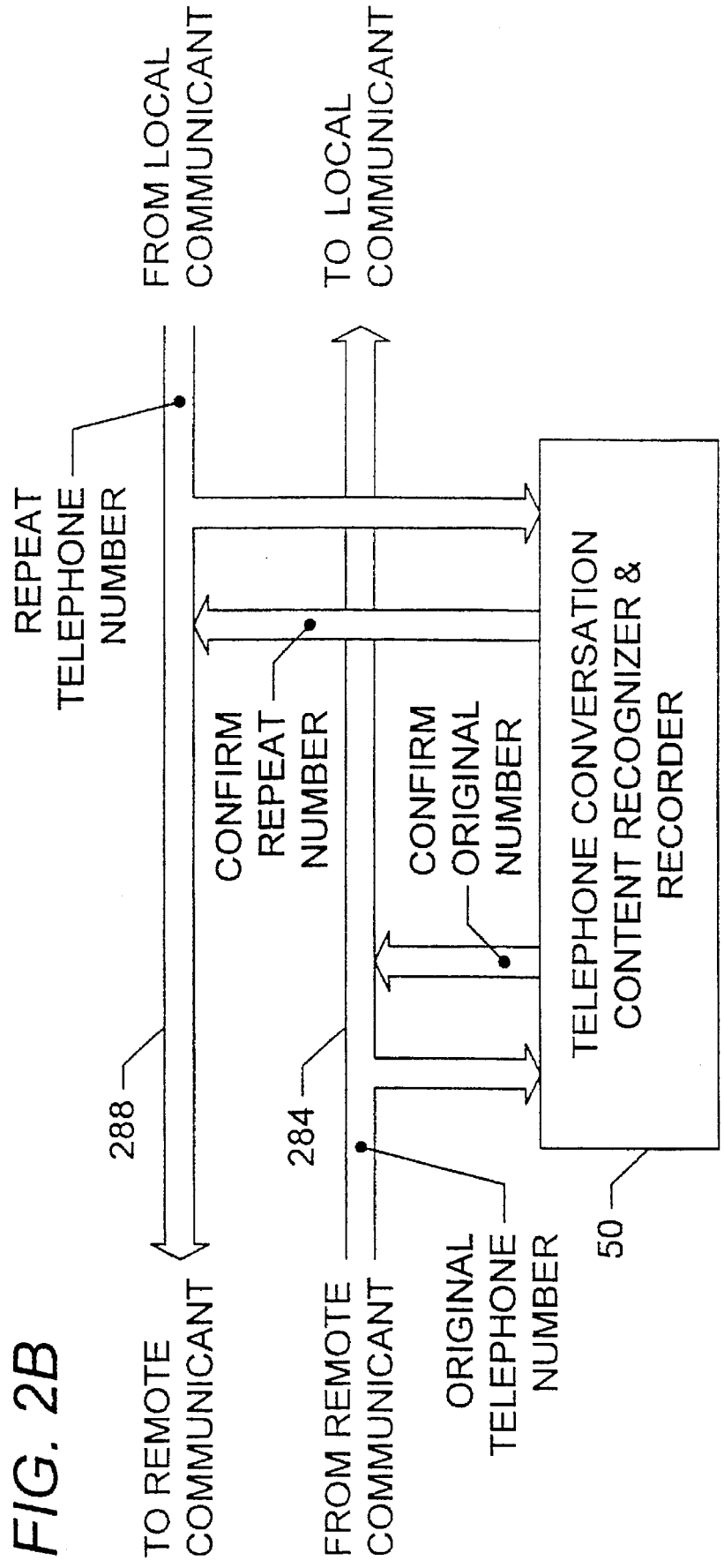
FIG. 2B is a simplified logic diagram of the audio channel scheme of the telephone conversation content recognizer and recorder of FIG. 1.

Two audio channels are operative in the apparatus of FIGS. 2A–2B: a first, receiving audio channel 284 (FIG. 2B) and a second, transmitting audio channel 288 (FIG. 2B). The first, receiving audio channel transfers an audio signal representing the contents of speech generated by a remote communicant from the telephone 10, via audio receive line 86 and amplifier 240, to loudspeaker 40 via mixer-amplifier 270. The second, transmitting audio channel transfers an audio signal representing the contents of speech generated by the local communicant from the microphone 30, via an amplifier 250 to the telephone 10, via mixer-amplifier 260 and audio transmit line 84.

The audio signal originating from the remote communicant and traveling over the first audio channel is also supplied to the analog input port of CODEC.220. The CODEC 220 performs analog to digital conversion by sampling the signal typically 8000 times per second. The digital samples are output from the CODEC onto the bidirectional digital bus 280. The digital bus 280 conveys the sampled audio to both the recognizer 200 and the recorder 210.

The CODEC 220 receives digital audio samples from the recognizer 200 or recorder 210, as determined by the cradle controller 60, via the bidirectional digital bus 280, typically at 8000 samples per second. The CODEC 220 performs digital to analog conversion and outputs the analog audio from its analog output port into the second audio channel via mixer-amplifier 260 and audio transmit line 84.

The audio signal originating from the local communicant at the microphone 30 and amplifier 250, and traveling along the second audio channel, is also supplied to the analog input port of CODEC 230. The CODEC 230 performs analog to digital conversion and outputs the digital samples into the bidirectional digital bus 280, that conveys the sampled audio to both the recognizer 200 and the recorder 210. The CODEC 230 receives digital audio samples from the recognizer 200 or recorder 220, as determined by the cradle controller 60, via the bidirectional digital bus 280, performs digital to analog conversion and outputs the analog audio from its analog output port into the loudspeaker 40 via mixer-amplifier 270.

The speech recognizer 200 is operative to recognize spoken telephone numbers, preferably telephone numbers spoken in
   a plurality of languages, and the speech recorder 210 is operative to record items of speech which need not be recognized such as messages and spoken telephone number-identifying titles.

Preferably, the speech recognizer 200 is also operative:
   a. To derive a speech template from a title recorded by the speech recorder 210 or from a voice command;
   b. To perform speaker dependent recognition of voice commands or titles by comparing an audio template of an audio rendition of a voice command or title to a previously derived speech template; and
   c. To perform text to speech synthesis, preferably in a plurality of languages, for confirmation of recognized spoken telephone numbers and for prompt generation.

The speech recognizer 200 preferably comprises a DSP (digital signal processor) 290 which performs speaker independent or speaker dependent recognition, generates confirming beeps, and synthesizes speech.

Figure 3:
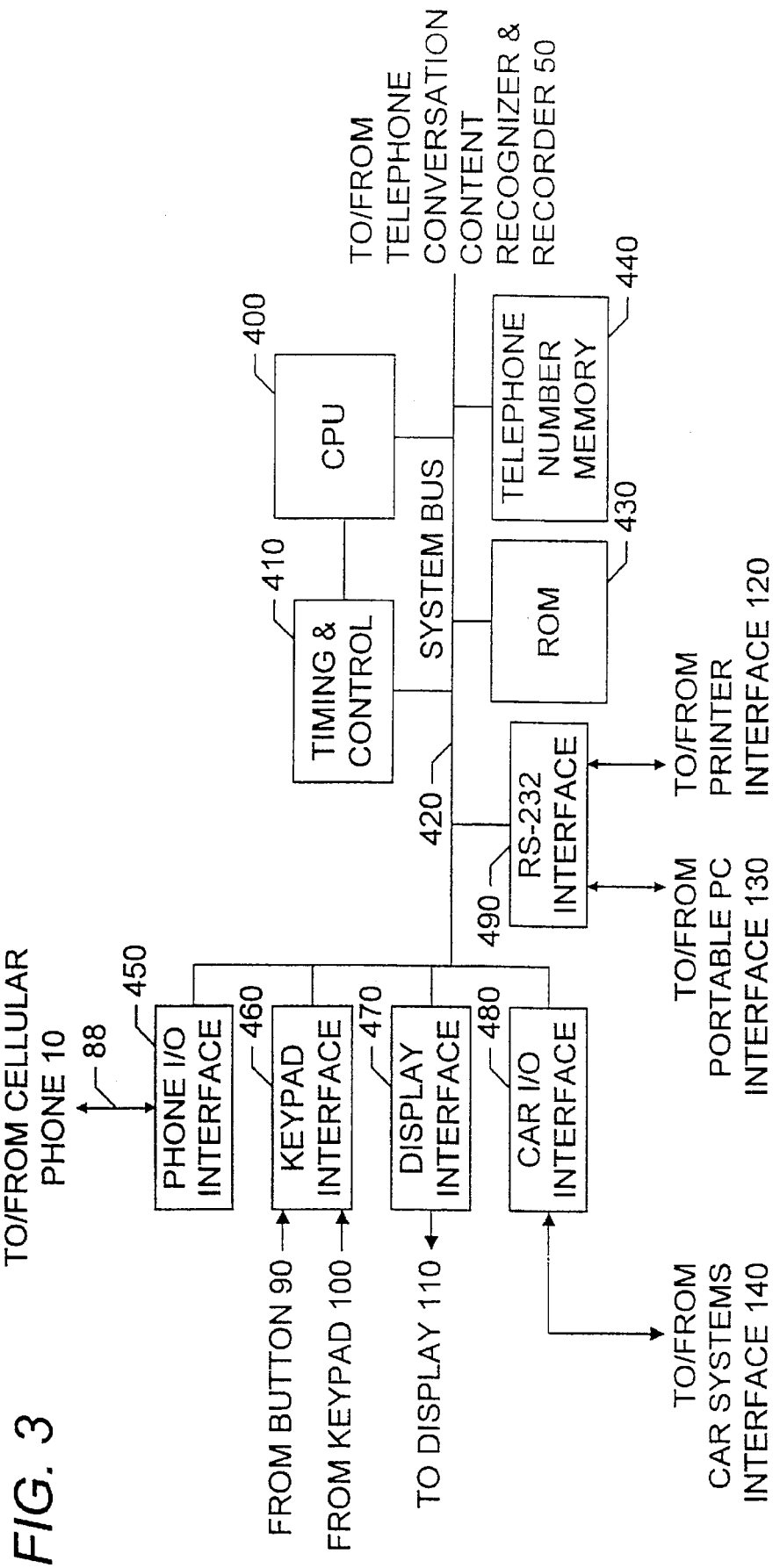
FIG. 3 is a simplified block diagram of the cradle controller or adapter controller of FIG. 1.

The DSP 290 is coupled, via a standard address, data and control bus 294, to:
   a. Timing and control circuitry 300 including crystal oscillators and logic circuits which generate:
      i. clock signals for the DSP 290 and for the digital bus 294,
      ii. address decoding signals for the ROM 310, RAM 320 and DPR 330, and
      iii. a wait state ("ready") signal for the DSP 290 that coordinates its access to the DPR 330.
   b. A read-only memory (ROM) 310 that accommodates software programs performed by the DSP 290. ROM 310 also typically stores speaker independent voice recognition parameters of at least the digits 0–9 and preferably of predetermined command words and of alphanumeric characters other than digits.
   c. A random-access memory (RAM) 320 that stores one or more speaker dependent voice templates and serves programs that run on the DSP 290, and
   d. A dual-port RAM (DPR) 330 which conveys data and commands between the speech recognizer 200 and the cradle controller 60 of FIG. 1. The DPR 330 has two ports ("sides"), where the first is coupled to the microprocessor bus 294 and the second is coupled to the controller's system bus 420 (FIG. 3).

Speaker-independent and speaker-dependent speech recognition may be implemented by a suitable software program stored in ROM 310. The ROM 310 also stores the speech parameters of the speaker-independent recognition. Preferably, a plurality of ROMs 310 are provided as replacement components, each of the replacement ROMs being operative to recognize and synthesize a different language.

One example of a suitable speaker dependent speech recognition software program is a standard DSP building block program by Voice Control Systems, 14140 Midway Rd., Suite 100, Dallas, Tex., USA, entitled "Discrete speaker-dependent speech recognition".

One example of a suitable speaker independent speech recognition software program is a standard DSP building block program by Voice Control Systems, 14140 Midway Rd., Suite 100, Dallas, Tex., USA, entitled "Discrete speaker-independent speech recognition".

The RAM 320 stores speech templates of the speaker-dependent recognition process which are acquired during a training process, in the course of which a user speaks specific words and phrases, and the DSP converts the spoken samples into parametric templates.

To perform speech recognition, which is a first basic process performed by the embodiment shown and described herein, audio samples fed to the DSP 290 from the digital bus 280 are analyzed by the DSP's program. Whenever a match is identified between a template and an audio sample, the DSP 290 sends the code of the identified word or phrase to the cradle controller 60, via the DPR 330. The DPR 330 may also be used for sending a copy of the speech templates stored in the RAM 320 to the cradle controller 60, for backup of the information in an external device such as a portable PC.

Text to speech synthesis is performed by a suitable software program which may be stored in ROM 310, along with rules and dictionaries necessary for producing accurate pronunciation. Preferably, as described above, a plurality of ROMs 310 are provided as replacement components, each of the replacement ROMs being operative to recognize and synthesize a different language.

One example of a suitable speech synthesis software program is a standard DSP building block program by Berkeley Speech Technologies, Inc., 2246 6th Street, Berkeley Calif. 94710, USA, entitled "BeSTspeech T-T-S".

To perform speech synthesis, which is another basic process performed by the embodiment shown and described herein, the cradle controller 60 sends text messages, comprising words and numbers, to the DSP 290, via the DPR 330. The DSP 290 applies the speech synthesis algorithm, rules and dictionaries to the input text, generating audio speech samples, which are fed to CODEC 220 or CODEC 230 via the digital bus 280.

The speech recorder 210 preferably comprises:
   a. A DSP (digital signal processor) 340 which performs compression of input voice data and stores the resulting compressed voice data in a title and message memory 380. The DSP 340 is also operative to retrieve and decompress compressed voice data from title and message memory 380.
   b. An address, data and control bus 350;
   c. Timing and control circuitry 360 which generates clock and control signals which are supplied to bus 350 and to DSP 340;

d. A ROM (read only memory) 370 which typically stores the DSP's program.

e. Title and message memory 380, which is typically based on a RAM and serves to store compressed voice data representing titles of stored telephone numbers (such as oral renditions of names of subscribers) and, optionally, messages associated with stored telephone numbers.

f. A DPR (dual ported RAM) 390 which conveys data and commands between the speech recognizer 200 and the cradle controller 60 of FIG. 1.

The recorder may be similar to the speech recognizer except that the RAM 380 is bigger than the RAM 320 since the recorder requires more RAM memory for storing of titles and speech messages. When it is desired to provide an amount of memory which exceeds the DSP's address range, a conventional technique such as memory bank switching may be employed to provide very large memory space.

Speech recording is still another basic process performed by the embodiment shown and described herein. To perform speech recording, the recorder 210 records speech messages in its RAM memory 380, and replays the messages upon request from the cradle controller 60. The DSP 340 performs speech compression on the audio samples incoming via the digital bus 280, using a suitable speech compression program stored in the ROM 370.

The speech compression method is selected according to desired quality of speech recording and may typically be changed by changing the ROM 370. An example of a suitable speech compression/decompression program is a standard DSP building block program by DSP Software Engineering, Inc., 165 Middlesex Turnpike, Suite 206, Bedford, Mass., USA, entitled "CCITT G.726 Audio Encoder/Decoder for TMS320C3x (G726-C3x-S)". The RAM 380 stores the recorded messages in compressed form, along with appropriate indexing of the messages.

To replay stored speech messages, which is yet another basic process performed by the embodiment shown and described herein, the DSP 340 reads the stored message from the RAM 380, and decompresses it using a suitable decompression program stored in the ROM 370, such as the speech compression/decompression program described above.

The program generates audio samples, fed to the digital bus 280. The DPR 390 receives record and replay commands from the cradle controller 60, and for sending memory status messages to the cradle controller 60. The DPR 390 is also optionally used for sending a copy of the messages stored in the RAM 320 to the cradle controller 60, for backup of the information in an external device such as a portable PC.

Although in the illustrated embodiment, speech recognition, speech synthesis and speech record and replay are implemented in two microprocessor based sections 200 and 210, this need not be the case. Alternatively, for example, speech recognition and synthesis can be implemented by means of commercially available integrated circuits (ICs), and speech compression and decompression can be implemented by a commercially available compression/decompression IC. IC based implementation may reduce hardware cost but is less flexible for changing languages and compression/decompression methods. Another alternative is a mixed methods design, where microprocessor based and IC based circuits are intermixed.

Although in the above description and elsewhere in the forgoing description, prompts and confirmations are described as being implemented by means of a text-to-speech process, it is appreciated that this need not be the case. Instead, for example, each prompt or confirmation in the present specification may comprise a rendition of a prestored suitable oral message.

FIG. 2B is a simplified logic diagram of the audio channel scheme of the telephone conversation content recognizer and recorder 50 of FIG. 1. A particular feature of the preferred embodiment shown and described herein is that a "three-way conversation" takes place when telephone numbers are recorded between the two conversing persons (the remote and local communicants) and between the telephone conversation content recognizer and recorder 50. Recognizer and recorder 50 is preferably operative to recognize and record a telephone number without disrupting the ability of the two communicants to speak to and hear one another. Alternatively, the recognizer and recorder 50 does temporarily disrupt the ability of the two communicants to speak to and hear one another. This ability is restored after the telephone number has been recognized and recorded, e.g. upon receipt of a "stop" voice command from the remote communicant.

FIG. 3 is a detailed description of the cradle controller 60 of FIG. 1. The cradle controller 60 comprises a CPU 400 which may be based on Intel's 80186 microprocessor and is typically associated with a timing and control unit 410. The CPU 400 is attached to a system bus 420 which typically comprises a standard 80186 address, data and control bus. The bus 420 couples the CPU 400 to a read-only memory ROM 430 that stores software programs performed by the microprocessor, and to a number memory 440 based on random-access memory (RAM) that stores recognized telephone numbers as well as program parameters. The bus 420 couples the CPU 400 to I/O interfaces such as the following: a telephone I/O interface 450, a keypad interface 460, a display interface 470, a vehicle I/O interface 480, and an RS-232 interface 490.

The phone I/O interface 450 includes input/output circuitry that enable the CPU 400 to receive and transmit data and commands to the cellular or mobile phone 10 via bidirectional control bus 88 of FIG. 1.

The keypad interface 460 typically comprises a commercially available interface IC attached to keypad 100 of FIG. 1. The keypad interface 460 is also preferably connected to the driver accessible activation button 90.

The display interface 470 typically comprises a commercially available display driver, attached to display 110 of FIG. 1.

The car I/O interface 480 includes input/output buffers and relays that enable the CPU 400 to sense and condition external car systems such as the car's radio, lights, windows and doors. For example, a mute command is sent to the car radio when a telephone call is answered, a radio station selection is made by voice command, or an open door is sensed by the multifunctional cradle or adapter that provides an oral "door open" warning.

An interface such as an RS-232 interface 490 provides two RS-232 serial ports. The first port serves for interfacing the cradle controller 60 to an external standard printer via printer interface 120. The printer is used for printing internally generated information such as recognized telephone numbers and the times at which they were recognized and recorded.

The second port interfaces to an external portable PC via portable PC interface 130 of FIG. 1. The PC (not shown) associated with PC interface 130 may be employed to exchange information items with the multifunctional cradle or adapter 20, as well as for making backup copies of the stored speech and non-speech information. The PC may run a special communication program for interfacing the multifunctional cradle 20. The interface to the RS-232 ports may be implemented by a commercially available dual serial interface IC.

The system bus 420 preferably extends to the speech recognizer 200 and speech recorder 210, coupling the system bus port of DPR 330 and DPR 390 to the cradle controller 60. The DPRs 330 and 390 may be used for exchange of data and commands between the controller 60 and the recognizer 200 or the recorder 210.

The timing and control circuit 410 typically includes crystal oscillator and logic circuits which are operative to generate:

a. clock signals for the CPU 400 and for the main system bus 420,
   b. address decoding signals for the ROM 430, RAM 440, I/O interfaces 450, 460, 470, 480 and 490 and the DPRs 330 and 390, and
   c. wait state ("ready") signal for the CPU 400 which coordinates the CPU's access to the DPRs 330 and 390.

It is noted that, as described in more detail above, the architecture of FIGS. 1–3 preferably allows all of the following basic operations to be performed: speech recognition and speech synthesis, by recognizer 200; and speech recording and speech play, by recorder 210.

Figure 4:
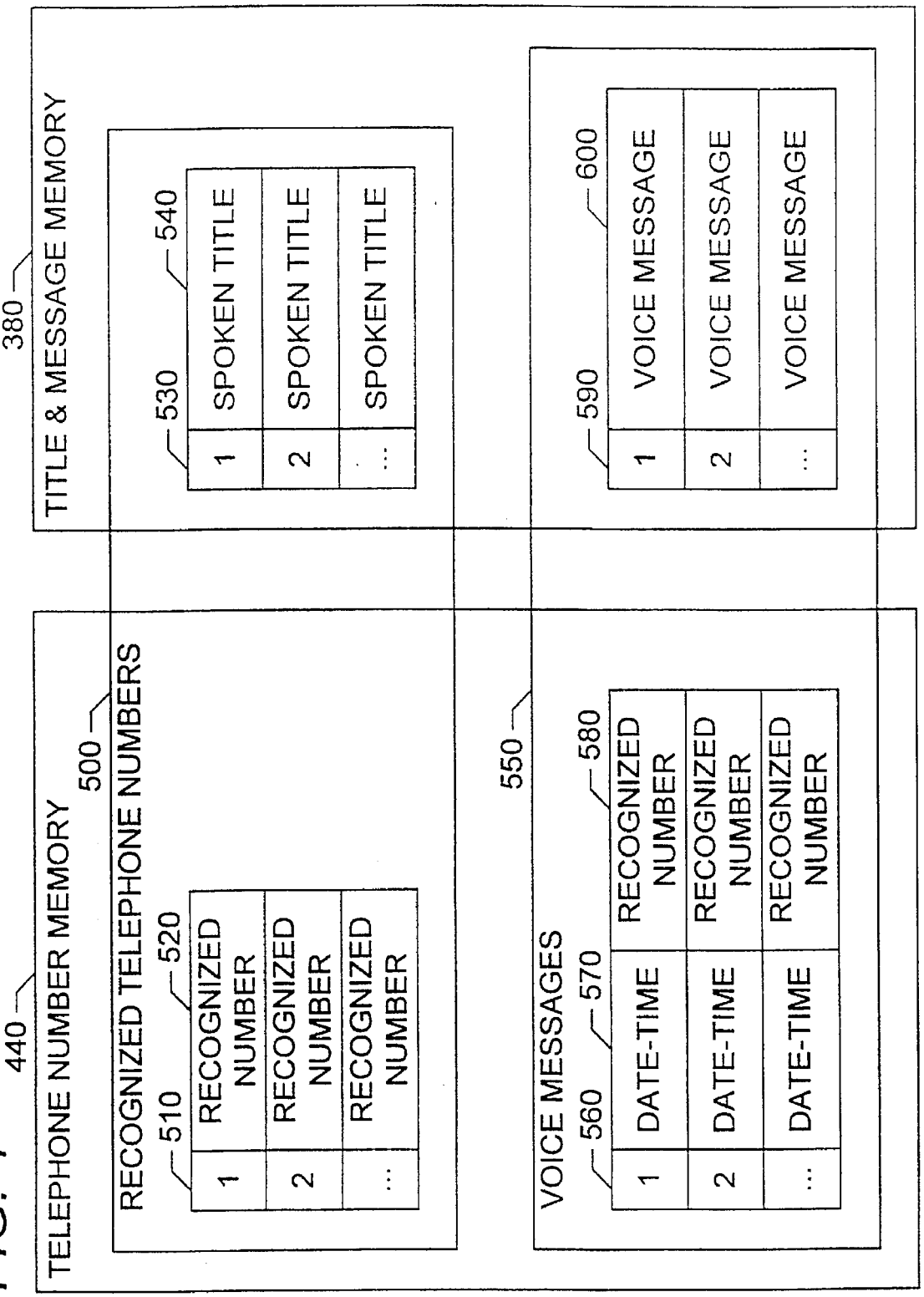
FIG. 4 is a graphic illustration of two data structures which are useful in implementing the functionalities of the cradle or adapter of FIG. 1.

FIG. 4 is a graphic illustration of two data structures 500 and 550, which may be managed in number memory 440 of cradle controller 60 and title and message memory 380 of speech recorder 210, and which are useful in implementing the above functionalities of cradle 20.

The first data structure 500 is a recognized telephone numbers data structure comprising a list of items representing telephone numbers recognized in the course of normal conversation.

Each item has two parts, residing in number memory 440 of cradle controller 60 and title and message memory 380 of speech recorder 210 respectively. The first part of each item typically comprises an index field 510 and a recognized number field 520. The second part of each item typically comprises an index field 530 and a spoken title field 540. The two parts of each item may be associated with one another by assigning and storing an identifying index number which is the same in both of index fields 510 and 530.

Number field 520, residing in memory 440, contains the telephone number recognized during a conversation. Title field 540, residing in memory 380, stores the digitally compressed audio of the spoken title, typically as uttered by the local communicant, also termed herein the "user". The size of this field preferably varies according to spoken title's length.

The second data structure 550 is a voice messages data structure comprising a list of items used for managing voice messages. Each item has two parts, residing respectively in number memory 440 of cradle controller 60 and in title and message memory 380 of speech recorder 210. The first part of each item typically comprises an index field 560, a date-time field 570 and a recognized number field 580. The second part of each item typically comprises an index field 590 and a voice message field 600. The two parts of each item are associated with one another by assigning and storing an identifying index number which is the same in both of index fields 560 and 590.

Time field 570 contains the date and time of recording of an individual message. Number field 580 is the telephone number recognized while recording a voice message. If several telephone numbers are recognized in one message, there will be several items in number memory 440, each with the same index number but with a different recognized number. Message field 600 stores the digitally compressed audio of the spoken message. The size of this field varies according to message's length.

Preferably, a third data structure, residing in RAM 320 of recognizer 200 is provided which is useful for recognizing speaker dependent voice commands (for example: "Dial") Each entry in the third data structure (not shown) has two fields. The first field is a command code, whose meaning is known to controller 60, for activating a specific operation. The second field contains a speaker-dependent speech template for the spoken command. The speech template is used for matching an uttered command to one of the voice commands stored in the third data structure.

Four functions of the apparatus of FIGS. 1–3, which employ the three above-described data structures, are now described with reference to FIGS. 5–8B. The four functions include:

a. Recognition of spoken telephone numbers in the course of a conversation between two persons (FIG. 5).
   b. Automatic dialing the numbers recognized in (a).
   c. "Answering machine" recording of incoming voice messages, including spoken numbers recognition (FIG. 7); and
   d. Playback of "answering machine-recorded" stored messages, including automatic dialing of recognized numbers (FIGS. 8A–8B).

Preferably, the multifunctional cradle or adapter 20 is also operative to print stored data, interface to a portable PC, and control car systems.

Figure 5:
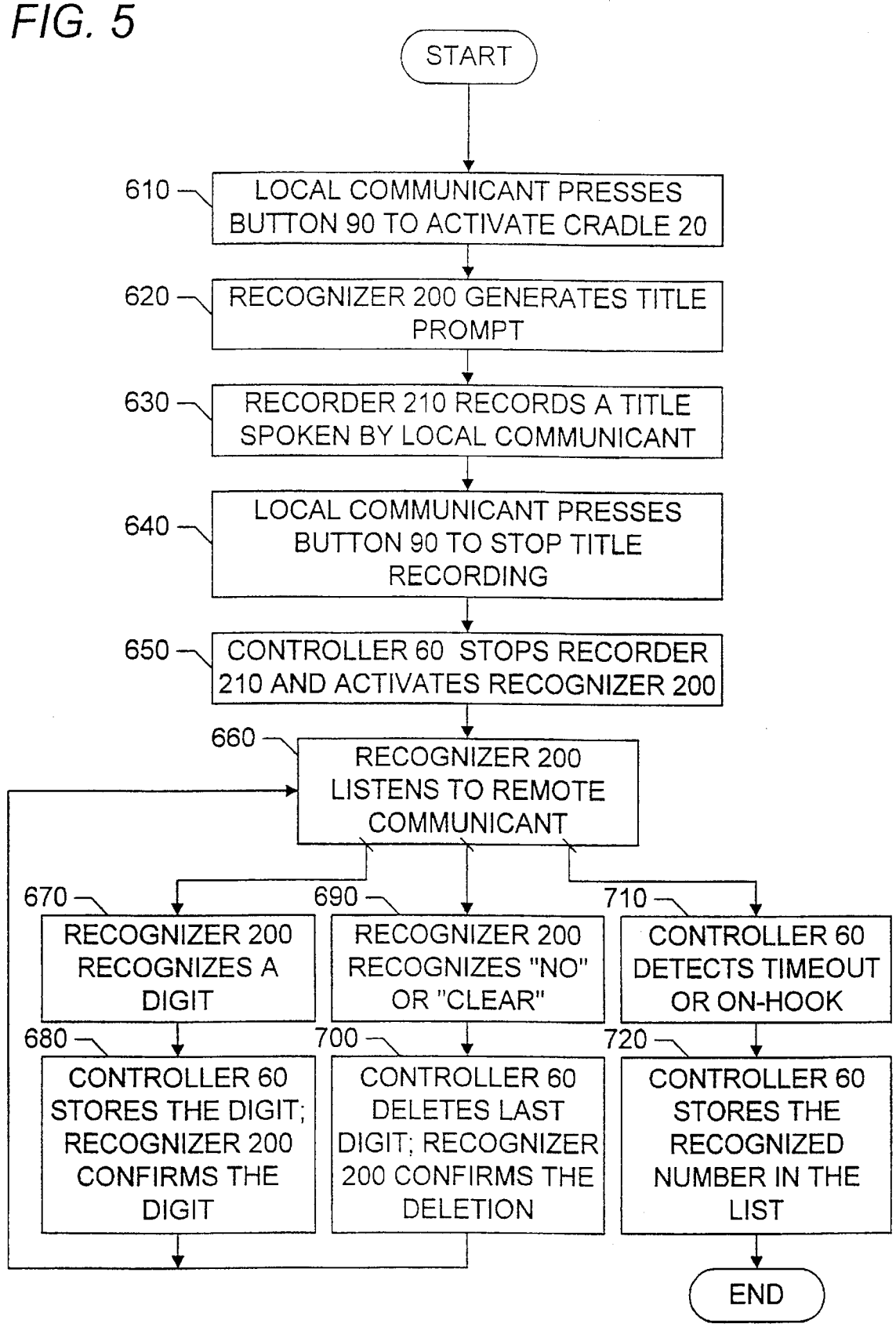
FIG. 5 is a simplified flowchart illustration of a preferred method for recognition of spoken telephone numbers in the course of a conversation between two persons.

Reference is now made to FIG. 5 which is a simplified flowchart illustration of a preferred method for recognition of spoken telephone numbers in the course of a telephone conversation.

Operation begins when the local communicant (the user) is engaged in normal telephone conversation, and the remote communicant wishes to give him a telephone number. The local communicant depresses the driver accessible activation button 90 (step 610). Alternatively, the local communicant may generate a voice command, for example: "Recognize numbers" (not shown).

Controller 60 senses the depression of button 90 by receiving an indication from keypad interface 460, and sends a speech synthesis command to recognizer 200 via system bus 420 and DPR 330 for uttering title prompt (for example: "Please say the caller's name"). Recognizer 200 sends the spoken prompt to loud-speaker 40 (step 620). Controller 60 then sends a RECORD command to recorder 210 via system bus 420 and DPR 370, in order to record the title uttered by the user. The command also contains a unique index number generated by controller 60.

The local communicant says a title for the telephone number (for example: "James Brown's office"). Recorder 210 receives the spoken title from microphone 30 (step 630). Recorder 210 compresses the speech and stores the compressed information in title field 540 of title and message memory 380. The local communicant terminates title recording by depressing button 90 again (step 640). Controller 60 stops title recording by sending a STOP command to recorder 210, and sends a LISTEN command to recognizer 200 (step 650). Recognizer 200 continuously receives digital samples of the remote communicant voice, searching for spoken digits.

Referring to step 660, three events may occur:

a. If recognizer 200 recognizes a spoken digit (step 670), it sends the digit to controller 60 via DPR 330 and system bus 420. Controller 60 temporarily stores the digit in an internal digit memory array (not shown), and sends a digit speech synthesis command to recognizer 200 for confirming the recognized digit (step 680). Alternatively, the audible confirmation may contain just a short beep. The cradle or adapter returns to step 660.

b. If recognizer 200 recognizes spoken "no" or "clear" words (step 690), uttered by remote communicant in response to digit confirmation to indicate that the last digit was an error, controller 60 removes the last digit from the digits memory array and sends a "canceled" speech synthesis command to recognizer 200 (step 700). The cradle or adapter returns to step 660.

c. If controller 60's inter-digit timer (not shown) expires, or controller 60 senses on-hook of the cellular or mobile telephone via bidirectional control bus 88 (step 710), controller 60 writes the recognized number (if any) to number field 520 in data structure 500, along with the index number in index field 510 (step 720). The operation ends. Alternatively, the inter-digit timer may be omitted or may be set for a very long time period and the remote communicant may indicate, by means of a "stop" voice command, that all digits of the telephone number have been spoken.

Figure 6:
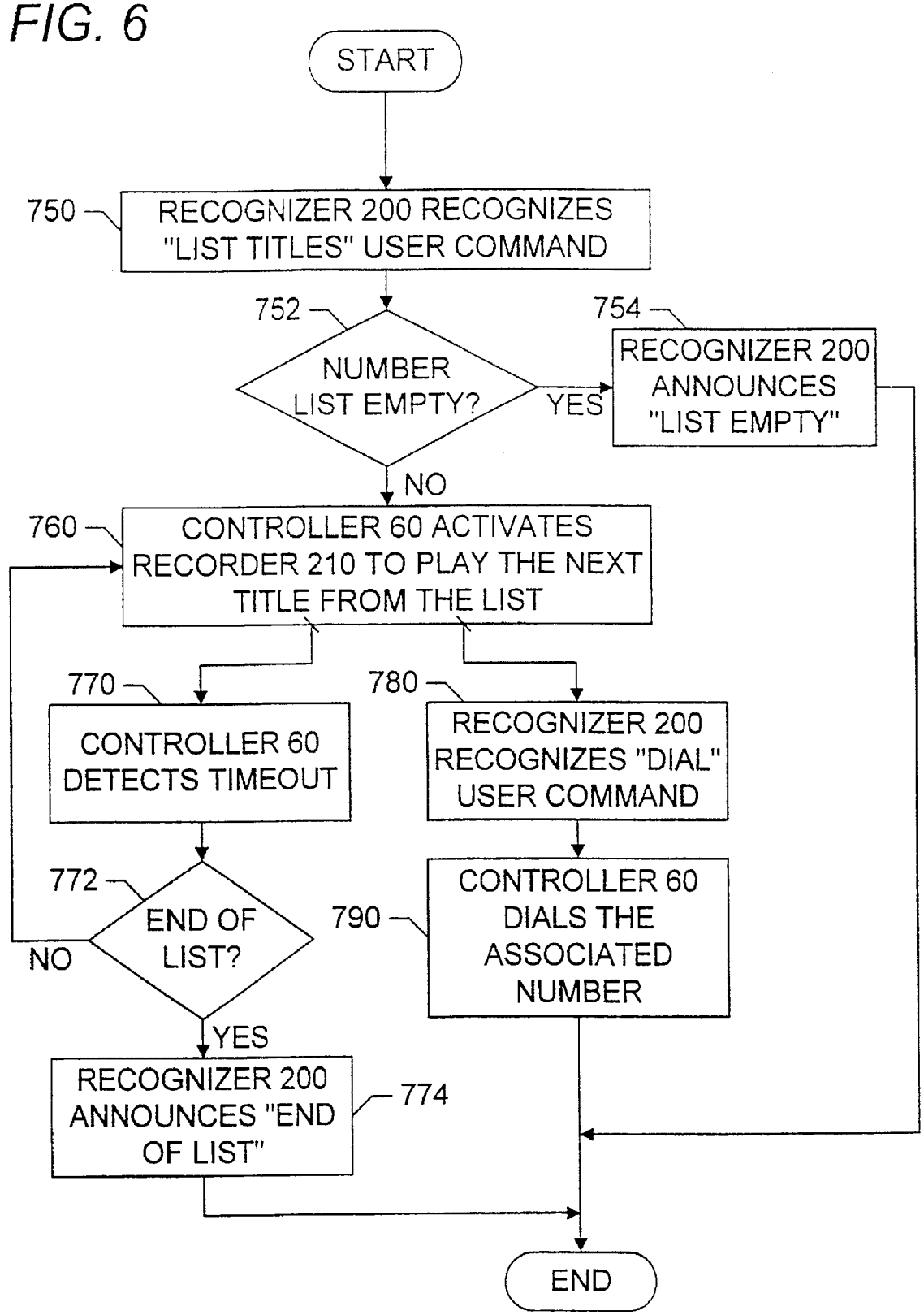
FIG. 6 is a simplified flowchart illustration of a preferred method for using recognized telephone numbers for automatic dialup of the numbers.

FIG. 6 is a simplified flowchart illustration of a method for automatically dialing stored recognized telephone numbers.

Operation begins when the user utters a "List titles" voice command, recognized by recognizer 200 (step 750). Alternatively, the user may depress a predetermined button on cradle keypad 100. Controller 60 starts scanning the recognized telephone numbers data structure 500. If the list 500 of FIG. 4 is empty (step 752) controller 60 commands recognizer 200 to announce "List empty" and terminates operation (step 754). Otherwise, for each item in list 500, controller 60 commands recorder 210 to playback the spoken title associated with the number (step 760).

Referring to step 760, after a title is played back, one of the following two events occurs:

a. If controller 60's command-timer (not shown) expires (step 770), controller 60 advances to step 772. Optionally, the command-timer may have a very short or zero time period in order to allow stored telephone numbers to be rapidly orally presented, initially, to the user. If the end of list 500 has not been reached then controller 60 returns to step 760 for playing the next title. Otherwise, controller 60 commands recognizer 200 to announce "End of list" and terminates the operation (step 774).

b. If a "Dial" voice command is recognized by recognizer 200 (step 780), or alternatively a predetermined button on keypad 100 is depressed, controller 60 dials the number contained in number field 520 by sending OFF-HOOK and DIAL commands to cellular or mobile phone 10 via bidirectional control bus 88 (step 790). Operation terminates and the call which has been set up is conducted unless a "busy" or "no-answer" signal is encountered.

It is appreciated that any suitable management procedure may be employed to manage the list 500 of recognized telephone numbers, including deletion of numbers upon request or following successful dialing thereof, prioritizing, automatic sequential dialing of numbers within a single priority level, automatic redialing of engaged (busy) numbers for which a "dial" user command was detected, and transfer to a permanent voice-controlled telephone directory.

Figure 7:
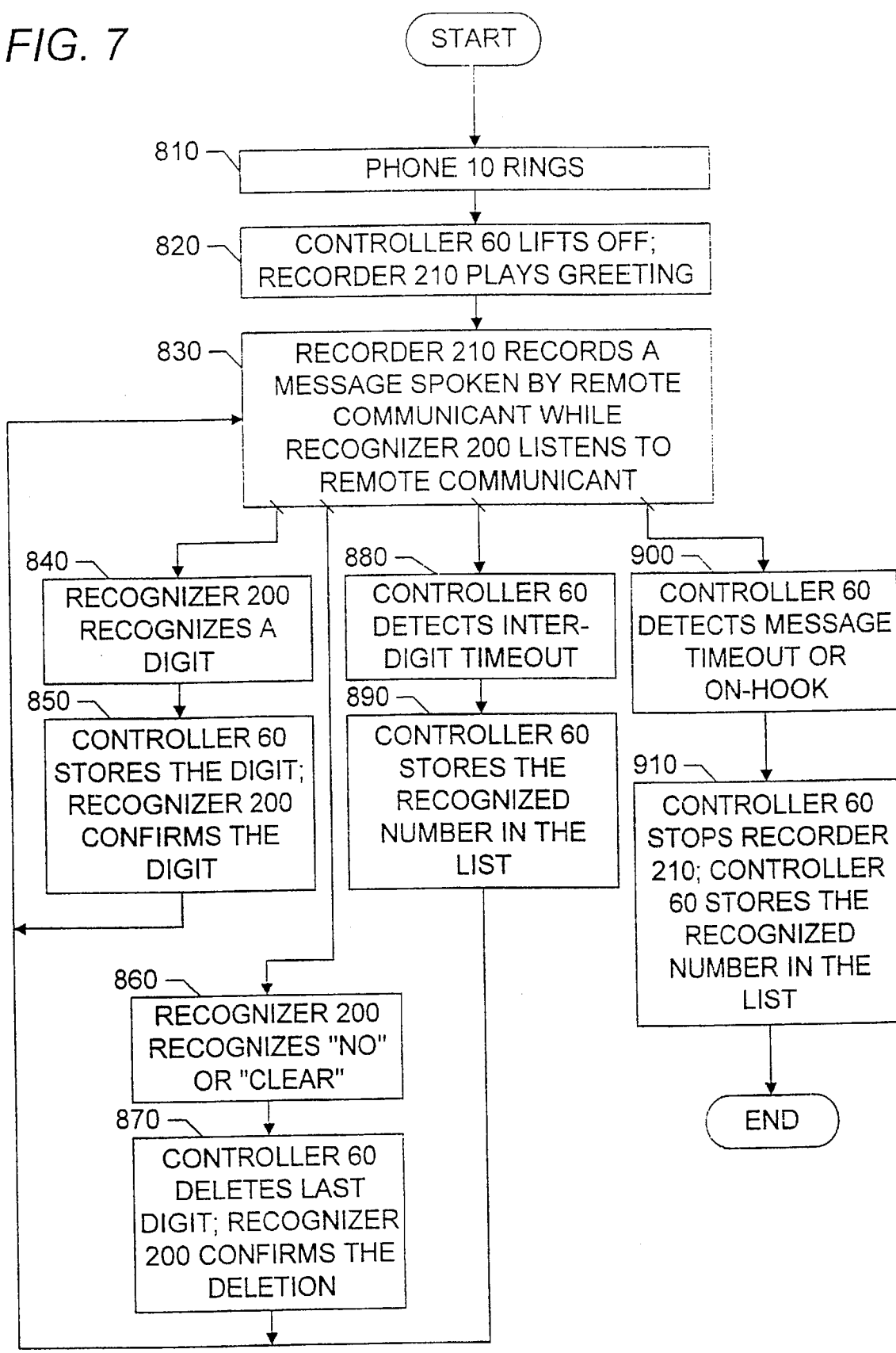
FIG. 7 is a simplified flowchart illustration of an "answering machine" recording of incoming voice messages, including spoken numbers recognition.
Figure 8A:
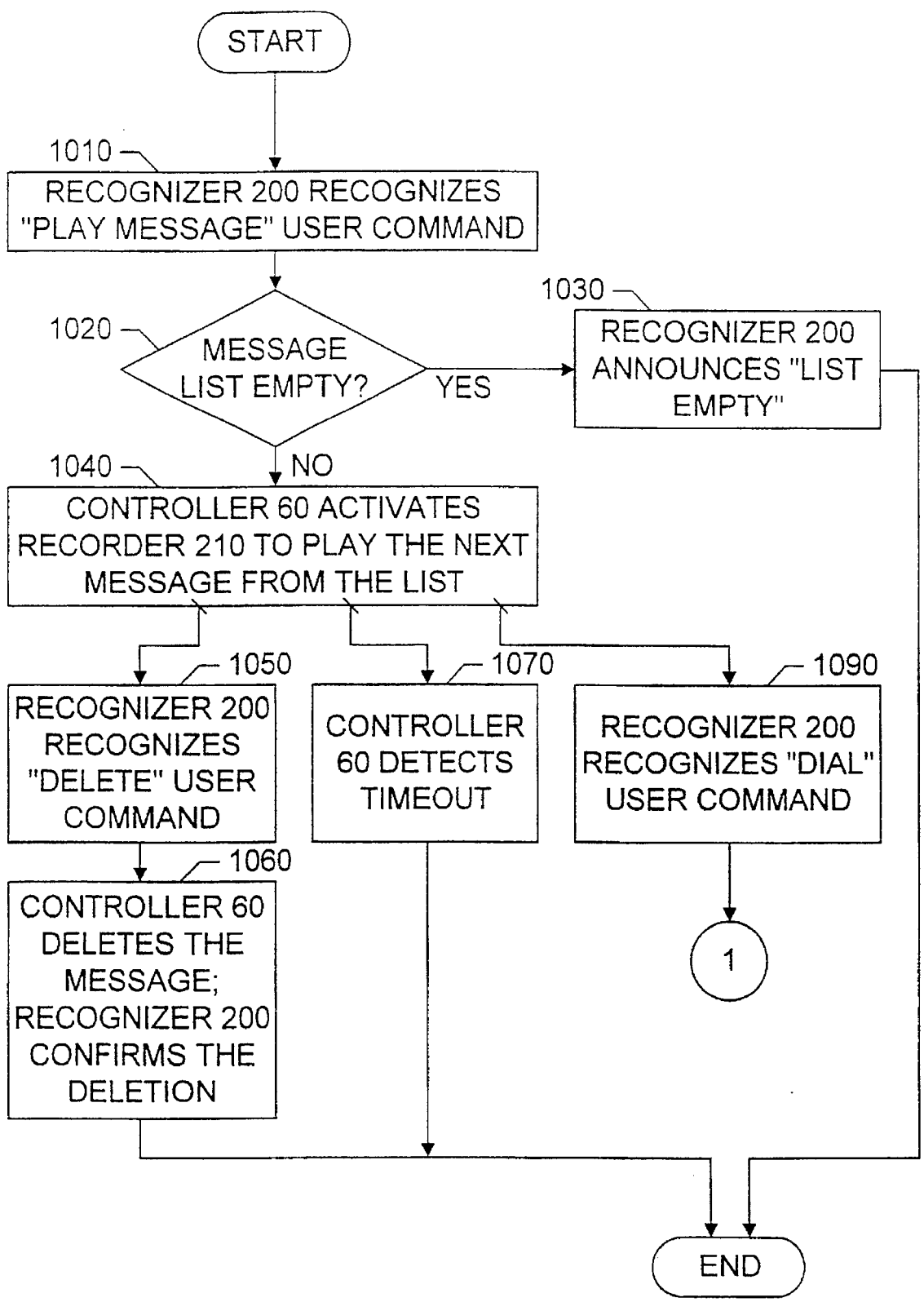
FIGS. 8A–8B, taken together, form a simplified flowchart illustration of a preferred method for playback of "answering machine-recorded" stored messages, including automatic dialup of recognized numbers.
Figure 8B:
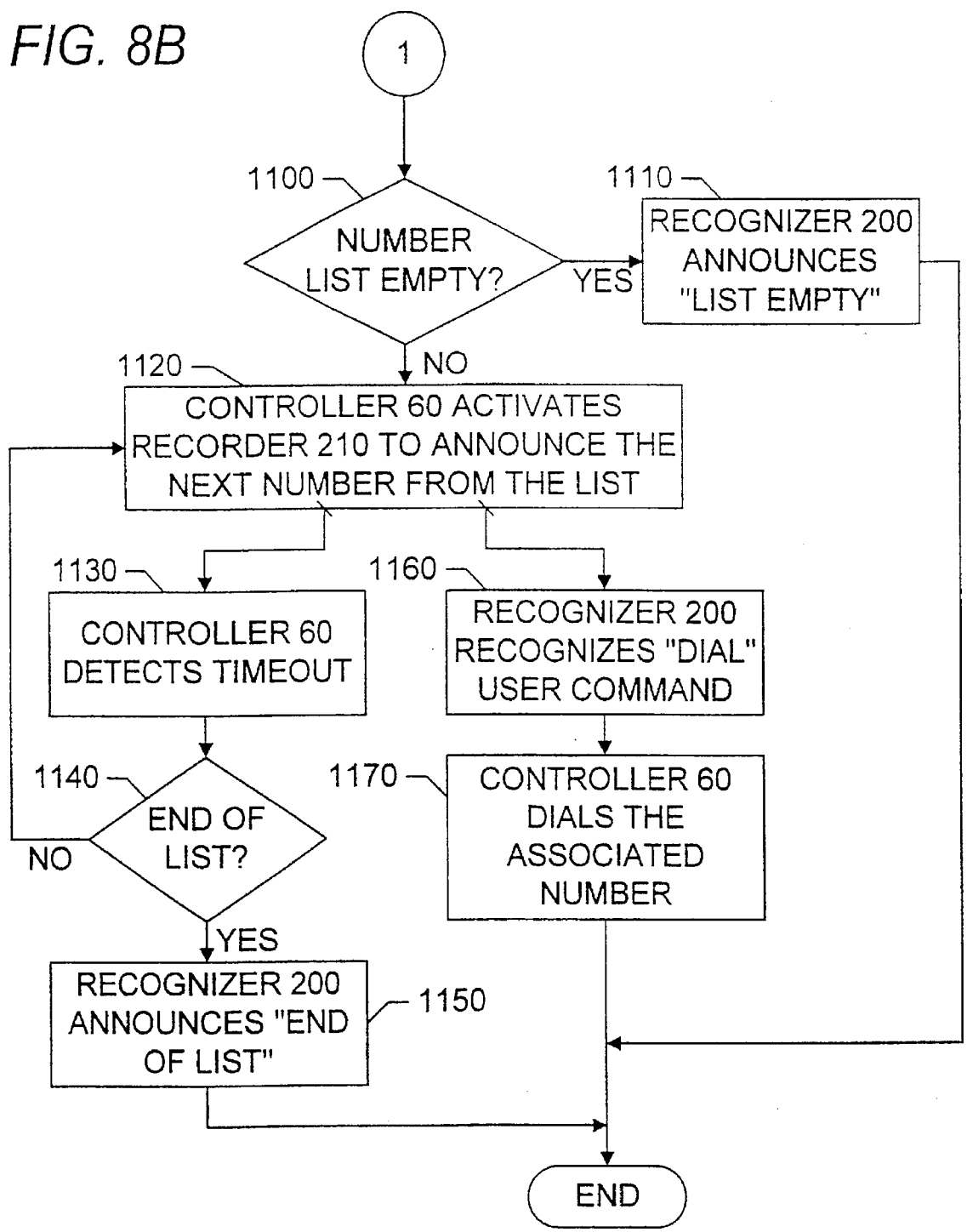

FIG. 7 is a simplified flowchart illustration of an "answering machine" method for recording incoming voice messages, including recognition of spoken numbers.

Operation initiates when telephone 10 rings to indicate arrival of a call (step 810). Controller 60 senses the telephone rings via bidirectional control bus 88 (step 820), sends an OFF-HOOK command to telephone 10 via bus 88, and sends a PLAY command instructing recorder 210 to play a prerecorded greeting message (for example: "This is John Smith's phone. Please leave your message and telephone number"). At the end of the greeting message (step 830), controller 60 sends a RECORD command to recorder 210, along with a unique message index number, and sends a LISTEN command to recognizer 200. Recognizer 200 continuously receives digital samples of the remote communicant's voice and searches the samples for spoken digits.

Referring to step 830, any of the following four events may occur:

a. If recognizer 200 recognizes a spoken digit (step 840), it sends the digit to controller 60 via DPR 330 and system bus 420. Controller 60 temporarily stores the digit in an internal digits memory array (not shown), and sends a digit speech synthesis command to recognizer 200 for confirming the recognized digit (step 850). Alternatively, the audible confirmation may contain just a short "beep". The cradle or adapter returns to step 830.

b. If recognizer 200 recognizes spoken "no" or "clear" words (step 860), uttered by the remote communicant in response to digit confirmation to indicate that the last digit is an error, controller 60 removes the last digit from the digits memory array and sends a "canceled" speech synthesis command to recognizer 200 (step 870). The cradle or adapter returns to step 830.

c. If controller 60's inter-digit timer (not shown) expires (step 880) controller 60 writes the recognized number to number field 580 in data structure 550, along with the message index number in index field 560 and date and time in time field 570 (step 890). The cradle or adapter returns to step 830, ready for recognizing another telephone number.

d. If a controller 60's message-length timer (not shown) expires or controller 60 senses on-hook of the cellular or mobile telephone via bidirectional control bus 88 (step 900), controller 60 stops recorder 210, writes the recognized number (if any) to number field 580 in data structure 550, writes the message index number in index field 560 and writes the date and time in time field 570 (step 910). The controller 60 sends an ON-HOOK command to the telephone 10 and operation ends.

Reference is now made to FIGS. 8A–8B which, taken together, form a simplified flowchart illustration of a preferred method for playback of "answering machine" stored messages, including automatic dialing of recognized numbers associated therewith.

Operation begins when the user utters a "Play message" voice command, recognized by recognizer 200 (step 1010). Alternatively, the user may depress a predetermined button on cradle keypad 100. If the message list 550 is empty (step 1020), controller 60 commands recognizer 200 to announce "List empty" and terminates the operation (step 1030).

Otherwise, if the message list 550 is not empty, controller 60 chooses the next message to play from the message list 550, according to the message's date and time, and commands recorder 210 to playback the message (step 1040).

Referring to step 1040, after the message is played back, any of the following three events may occur:

a. If recognizer 200 recognizes a "Delete" voice command (step 1050), or controller 60 senses depression of a predetermined button on keypad 100, controller 60 deletes the message by sending a DELETE MESSAGE command to recorder 210 (step 1060), removes the message from the message list 550, and sends a speech synthesis command to recognizer 200 for confirmation (for example: "Deleted"). The operation ends.

b. If controller 60's command-timer (not shown) expires (step 1070), or controller 60 senses depression of a predetermined button keypad 100 (not shown), controller 60 does not delete the message. The operation ends.

c. If recognizer 200 recognizes "Dial" voice command (step 1090), or controller 60 senses depression of a predetermined button on keypad 100, controller 60 starts scanning the recognized telephone numbers associated to the message. If there are no recognized numbers (step 1100), controller 60 commands recognizer 200 to announce "List empty" and terminates the operation (step 1110). Otherwise, for each recognized number associated with the message, controller 60 sends a speech synthesis command to recognizer 200 for announcing the recognized number (step 1120). Typically, no spoken title is attached to the one or more telephone numbers which may be recognized during a single voice message recording.

Referring to step 1120, after a telephone number is announced, either of the following two events may occur:

a. If controller 60's command-timer (not shown) expires (step 1130), controller 60 moves to step 1140. If additional recognized numbers exist, controller 60 returns to step 1120 for announcing the next number. If no more recognized numbers remain, controller 60 commands recognizer 200 to announce "End of list" and terminates the operation (step 1150).

b. If a "Dial" voice command is recognized by recognizer 200 (step 1160), or alternatively a specific button in keypad 100 is depressed (not shown), controller 60 dials the number contained in number field 580 by sending OFF-HOOK and DIAL commands to cellular or mobile phone 10 via bidirectional control bus 88 (step 1170). The operation ends.

Figure 9:
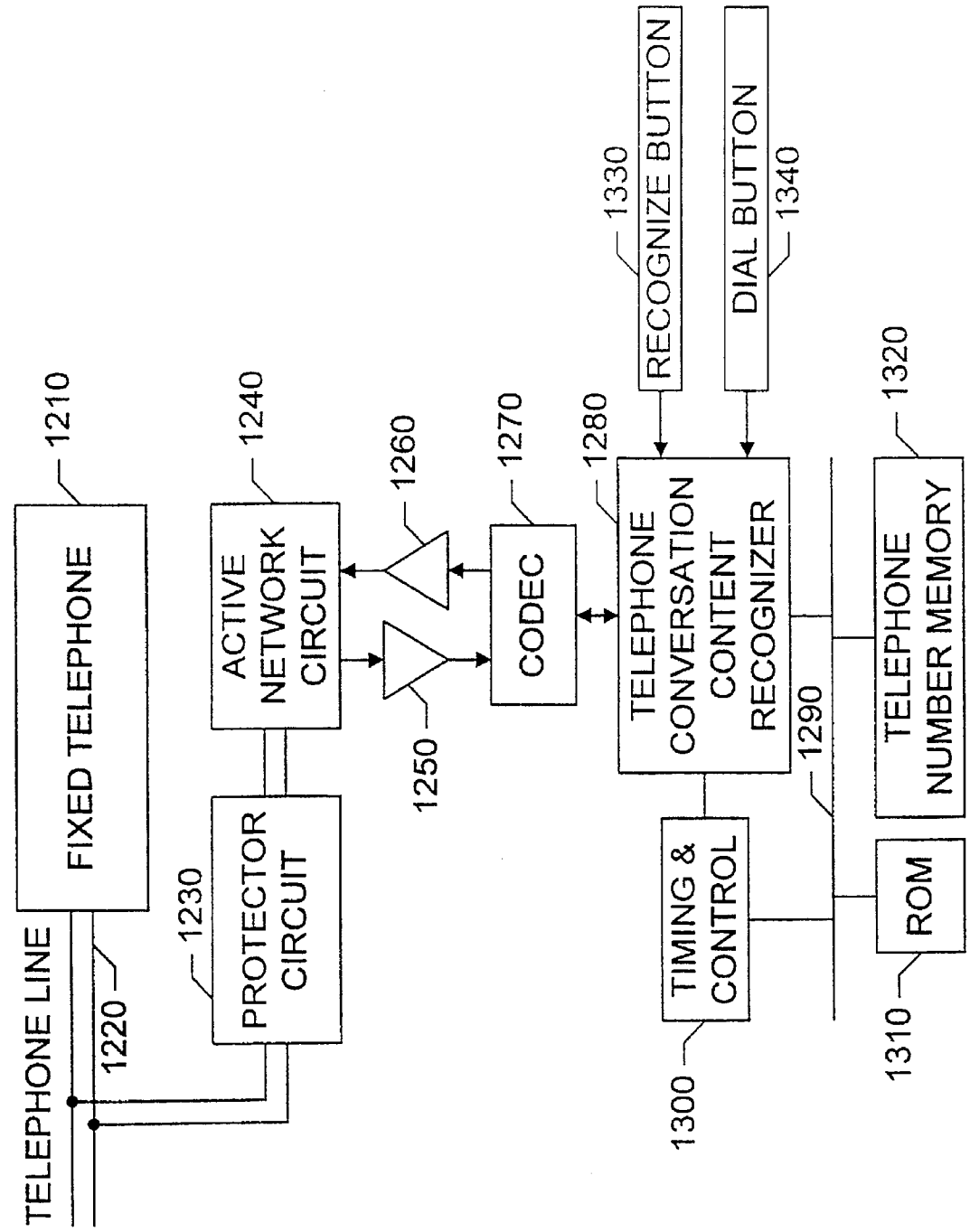
FIG. 9 is a simplified functional block diagram of a fixed telephone accessory device, constructed and operative in accordance with a preferred embodiment of the present invention and associated with a fixed telephone.

FIG. 9 is a simplified functional block diagram of a fixed telephone accessory device, constructed and operative in accordance with a preferred embodiment of the present invention and associated with a fixed telephone. The accessory device of FIG. 9 is preferably operative to perform the following functions:

a. Recognizes at least one telephone number spoken in the course of a telephone conversation between a remote communicant and the local communicant. Recognition of the telephone number/s may be either speaker-dependent or speaker-independent. Preferably, the apparatus of FIG. 9 is also operative to confirm a spoken telephone number by reproducing the recognized telephone number;

b. stores the recognized telephone number or numbers; and c. retrieves any of the telephone numbers and automatically dials the retrieved number.

The apparatus of FIG. 9 comprises a fixed telephone 210 connected to a two-wire telephone line 1220. The telephone line 1220 is also connected to conventional protector circuitry 230 that provides proper tip and ring polarity and high voltage surge protection. The protector 1230 is connected to conventional active network circuitry 1240 that provides a separate receiving audio channel and transmitting audio channel. The receiving channel is connected to an amplifier 1250 and to a coder/decoder (CODEC) 1270. The transmitting channel is connected to coder/decoder 1270 via an amplifier 1260. The CODEC 1270 is connected to a telephone conversation content recognizer 1280.

The receiving audio channel transfers an audio signal representing the contents of speech generated by the remote or the local communicant from the telephone line 1220, via protector 1230, network 1240 and amplifier 1250, to the analog input port of CODEC 1270. The CODEC 1270 performs analog to digital conversion by sampling the signal typically 8000 times per second. The digital samples are output from the CODEC to the recognizer 1280.

The transmitting audio channel transfers an audio signal representing the contents of speech generated by the recognizer 1280 to telephone line 1220, from the analog output port of CODEC 1270, via an amplifier 1260, network 1240 and protector 1230. The CODEC 1270 receives digital audio samples from the recognizer 1280, typically at 8000 samples per second.

The telephone conversation content recognizer 1280 typically comprises a suitably programmed DSP (digital signal processor) which is operative to recognize spoken telephone numbers, preferably telephone numbers spoken in a plurality of languages. The DSP performs speaker independent or speaker dependent recognition, generates confirming beeps, and synthesizes speech. The recognizer 1280 may be coupled, via a standard address, data and control bus 1290, to:

a. Timing and control circuitry 1300 such as crystal oscillators and logic circuits which generates clock signals for the recognizer 1280 and for the bus 1290, and address decoding signals for the ROM 1310 and number memory 1320.

b. A read-only memory (ROM) 1310 that accommodates software programs performed by the recognizer 1280. ROM 1310 also typically stores speaker independent voice recognition parameters of at least the digits 0–9 and preferably of predetermined command words and of alphanumeric characters other than digits.

c. A number memory 1320, implemented by a random-access memory (RAM), that stores recognized telephone numbers, speaker dependent voice templates and serves programs run on the recognizer 1280.

The recognizer 1280 is also coupled to a user-accessible "Recognize" button 1330 and a user-accessible "Dial" button 1340 which may, for example, be mounted on the telephone base.

The architecture of FIG. 9 supports basic operations of speech recognition and speech synthesis, as is now described.

Speaker-independent and speaker-dependent speech recognition may be implemented by a suitable software program stored in ROM 1310, such as the speech recognition programs described above.

The ROM 1310 also stores the speech parameters of the speaker-independent recognition. In the process of recognition, audio samples fed to the recognizer 1280 from the CODEC 1270 are analyzed by the DSP's program. Preferably, a plurality of ROMs 1310 are provided as replacement components, each of the replacement ROMs being operative to recognize and synthesize a different language.

The number memory 1320 stores speech templates of the speaker-dependent recognition process which are acquired during a training process, in the course of which a user speaks specific words and phrases, and the DSP converts the spoken samples into parametric templates.

Text to speech synthesis is performed by a suitable software program, such as the text-to-speech synthesis program described above, which may be stored in ROM 1310, along with rules and dictionaries necessary for producing accurate pronunciation.

Preferably, as described above, a plurality of ROMs 1310 are provided as replacement components, each of the replacement ROMs being operative to recognize and synthesize a different language.

In the process of speech synthesis, the recognizer 1280 applies the speech synthesis program, rules and dictionaries to desired text, generating audio speech samples, which are fed to CODEC 1270. The recognizer 1280 is also capable of generating standard DTMF digits, for performing outgoing dial operation.

An example of a suitable program for generating DTMF digits is a standard DSP building block by DSP Software Engineering, Inc., entitled "DTMF Encoder/Decoder for TMS320C3x (DTMF-C3X-S)".

Although in the illustrated embodiment, speech recognition and speech synthesis are implemented in a microprocessor based design which is separate from the fixed telephone 1210 circuits, this need not be the case. Alternatively, for example, speech recognition and synthesis can be implemented by means of commercially available integrated circuits (ICs), merged with the fixed telephone 1210 circuits. IC based implementation may reduce hardware cost but is less flexible for changing languages. Another alternative is a mixed methods design, where microprocessor based and IC based circuits are intermixed.

Figure 10:
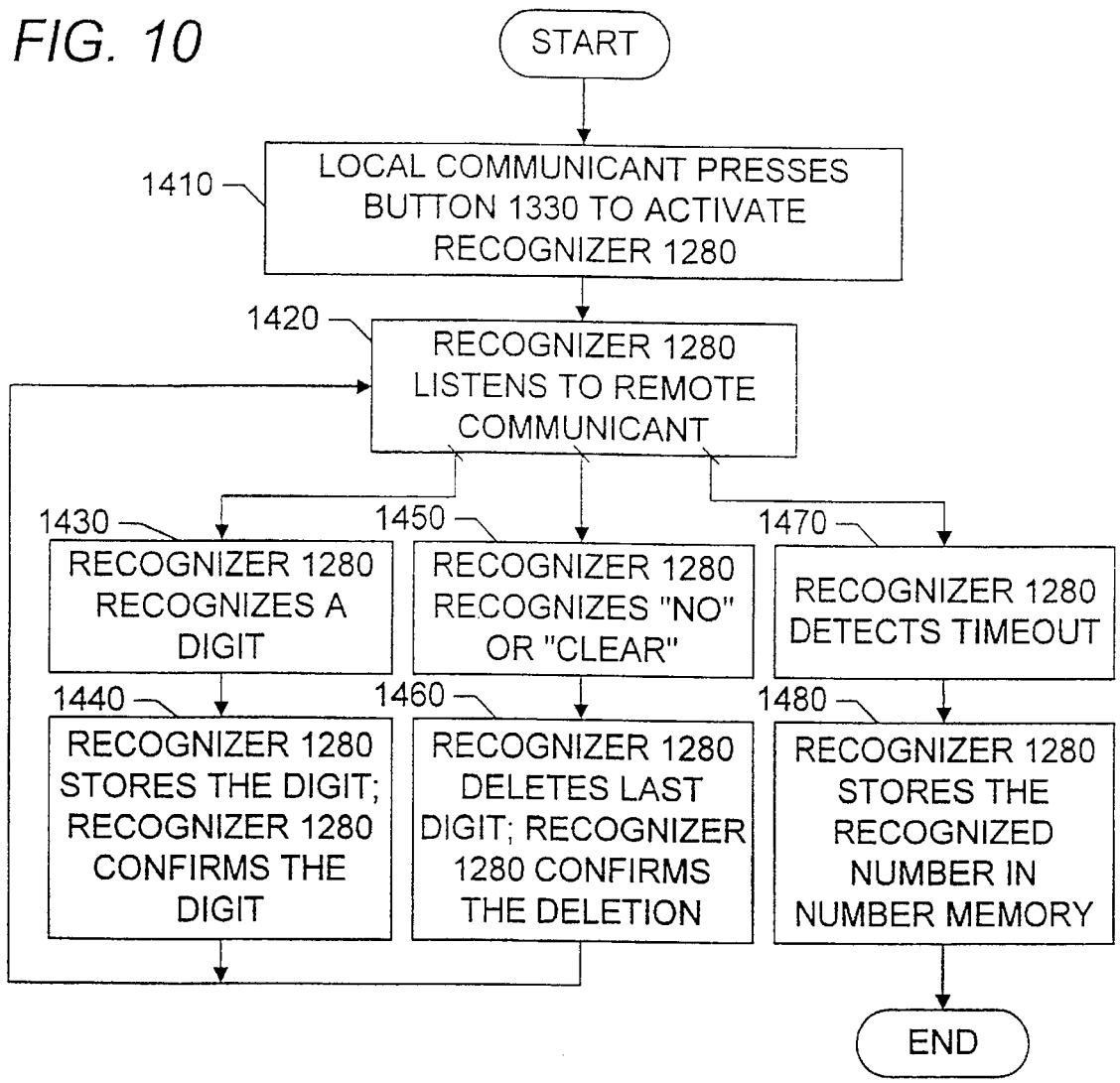
FIG. 10 is a simplified flowchart illustration of a preferred method for recognition of spoken telephone numbers in the course of a telephone conversation.

Reference is now made to FIG. 10 which is a simplified flowchart illustration of a preferred method for recognition of spoken telephone numbers in the course of a telephone conversation.

Operation begins when the local communicant (the user) is engaged in normal telephone conversation, and the remote communicant wishes to give him a telephone number. The local communicant depresses the "recognize number" button 1330 (step 1410). Alternatively, the local communicant may generate a voice command, for example: "Recognize numbers" (not shown). Recognizer 1280 senses the depression of button 1330, and starts listening to the remote communicant, searching the remote communicant's speech for spoken digits (step 1420).

Referring to step 1420, three events may occur:

a. If recognizer 1280 recognizes a spoken digit (step 1430), it stores the digit in the number memory 1320 and generates a digit speech synthesis for confirming the recognized digit (step 1440). Alternatively, the audible confirmation may contain just a short beep. The recognizer returns to step 1420.

b. If recognizer 1280 recognizes spoken "no" or "clear" words (step 1450), uttered by remote communicant in response to digit confirmation to indicate that the last digit was an error, recognizer 1280 removes the last digit from the number memory 1320 and generates a "canceled" speech synthesis (step 1460). The recognizer returns to step 1420.

c. If recognizer 1280's inter-digit timer (not shown) expires (step 1470), it stores the recognized number (if any) in the number memory 1320, and stops listening (step 1480). The operation ends. Alternatively, the inter-digit timer may be omitted or may be set for a very long time period and the remote communicant may indicate, by means of a "stop" voice command, that all digits of the telephone number have been spoken.

Automatic dialing of the stored recognized telephone number is performed as follows:

a. The user lifts off the handset of the fixed telephone 1210, and depresses dial button 1340.

b. Recognizer 1280 checks the number memory 1320. If there is no recognized number, recognizer 1280 generates a "no number" speech synthesis. Otherwise, recognizer 1280 dials the number contained in number memory 1320 by generating DTMF digits of the stored number. The dial operation terminates and the call which has been set up is conducted, unless a "busy", "no-answer", "out of service" or other similar signal is encountered.

The fixed-telephone embodiment of FIG. 9 stores a single telephone number and therefore does not manage lists of more than one telephone number, does not record spoken telephone number-identifying titles and does not accept voice commands from the local communicant.

It is appreciated that the fixed-telephone embodiment of FIG. 9 can be modified to store more than one telephone number, to manage lists of more than one telephone number, to record spoken telephone number-identifying titles, and to accept voice commands from the local communicant, all as described above with reference to the cellular or mobile telephone embodiment of FIGS. 1–8.

The fixed-telephone embodiment of FIG. 9, as illustrated, is based on DTMF dialing. However, alternatively, any other dialing method may be employed such as pulse dialing. Conventional methods for handling pulse dialing are described, for example, in Electronic Engineers' Handbook, Fink, D. G. and Christiansen, D., 2nd Ed., McGraw-Hill, New York.

Figure 11:
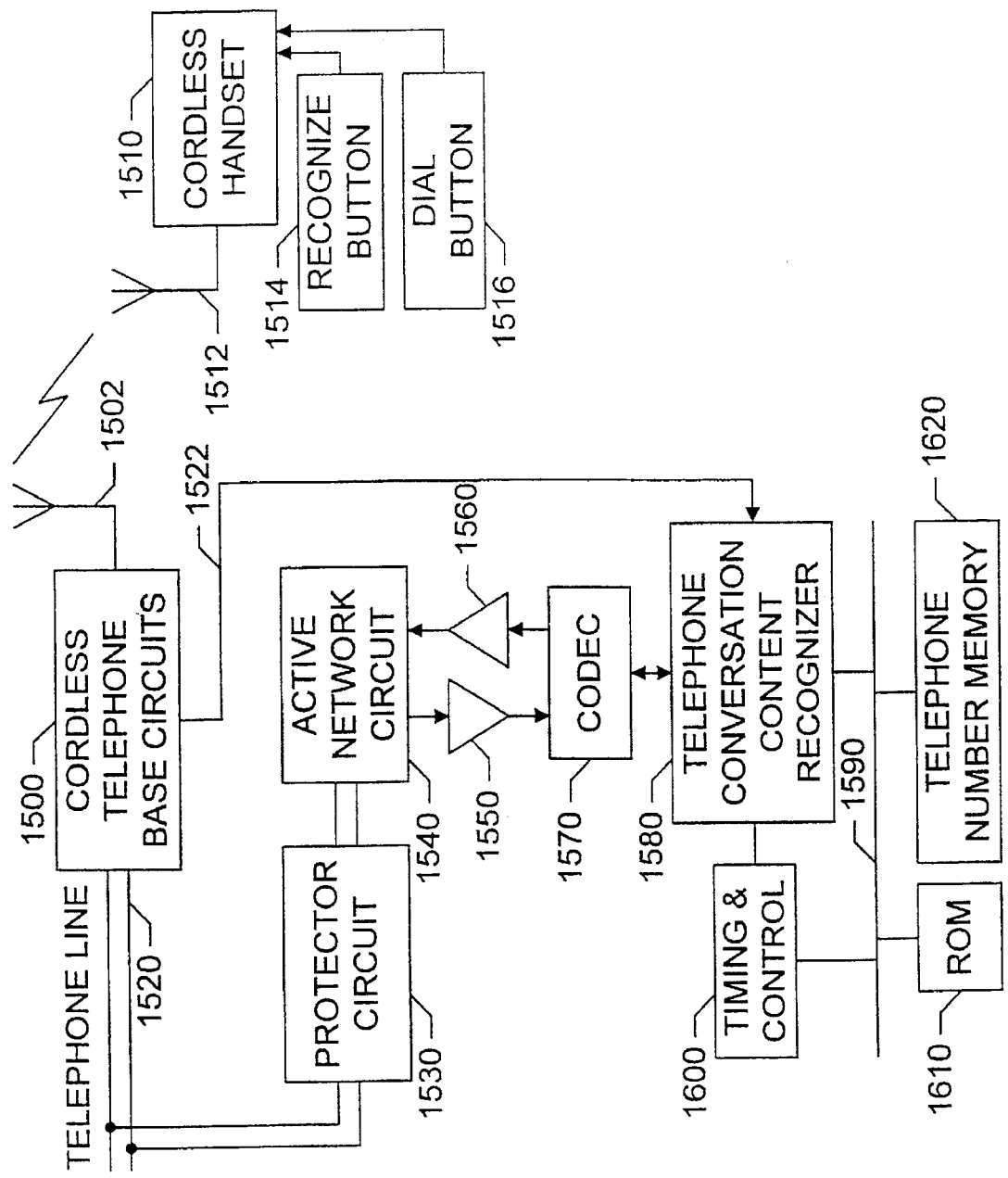
FIG. 11 is a simplified functional block diagram of a cordless telephone accessory device, constructed and operative in accordance with a preferred embodiment of the present invention and associated with a cordless telephone.

FIG. 11 is a simplified functional block diagram of a cordless telephone accessory device, constructed and operative in accordance with a preferred embodiment of the present invention and associated with a cordless telephone. The accessory device of FIG. 11 is preferably operative to perform the following functions:

a. Recognizes at least one telephone number spoken in the course of a telephone conversation between a remote communicant and the local communicant. Recognition of the telephone number/s may be either speaker dependent or speaker independent. Preferably, the apparatus of FIG. 11 is also operative to confirm a spoken telephone number by reproducing the recognized telephone number;

b. Stores the recognized telephone number; and c. Retrieves the telephone number and automatically dials the retrieved number.

The apparatus of FIG. 11 comprises a cordless telephone base 1500 with an antenna 1502, connected to a two-wire telephone line 1520 and a signal link 1522. Cordless handset 1510 is associated with a base 1512 via an antenna 1512. The handset 1510 includes a conventional telephone keypad (not shown) as well as a "Recognize" button 1514 and a "Dial" button 1516 which are mounted on the handset. When button 1514 or 1516 is depressed, the handset 1510 transmits a unique code to base 1500. Base 1500 in turn sends a unique signal (e.g. an interrupt signal for representing the depression of "Recognize" or "Dial" button) via signal link 1522.

The telephone line 1520 is also connected to conventional protector circuitry 1530 that provides proper tip and ring polarity and high voltage surge protection. The protector 1530 is connected to conventional active network circuitry 1540 which provides a separate receiving audio channel and transmitting audio channel. The receiving channel is connected to an amplifier 1550 and to a coder/decoder 1570. The transmitting channel is connected to coder/decoder 1570 via an amplifier 1560. The CODEC 1570 is connected to a telephone conversation content recognizer 1580.

The receiving audio channel transfers an audio signal representing the contents of speech generated by the remote or the local communicant from the telephone line 1520, via protector 1530, network 1540 and amplifier 1550, to the analog input port of CODEC 1570. The CODEC 1570 performs analog to digital conversion by sampling the signal typically 8000 times per second. The digital samples are output from the CODEC to the recognizer 1580.

The transmitting audio channel transfers an audio signal representing the contents of speech generated by the recognizer 1580 to telephone line 1520, from the analog output port of CODEC 1570, via amplifier 1560, network 1540 and protector 1530. The CODEC 1570 receives digital audio samples from the recognizer 1580, typically at 8000 samples per second.

The telephone conversation content recognizer 1580, which may be implemented by a suitably programmed DSP (digital signal processor), is operative to recognize spoken telephone numbers, preferably telephone numbers spoken in a plurality of languages. The DSP performs speaker independent or speaker dependent recognition, generates confirming beeps, and synthesizes speech. The recognizer 1580 is coupled, via a standard address, data and control bus 1590, to:

a. Timing and control circuitry 1600, including crystal oscillators and logic circuits which generates clock signals for the recognizer 1580 and for the bus 1590, and address decoding signals for the ROM 1610 and number memory 1620.

b. A read-only memory (ROM) 1610 that accommodates software programs performed by the recognizer 1580. ROM 1610 also typically stores speaker independent voice recognition parameters of at least the digits 0–9 and preferably of predetermined command words and of alphanumeric characters other than digits.

c. A telephone number memory 1620, implemented by a random-access memory (RAM), that stores recognized telephone numbers and speaker dependent voice templates and serves programs run on the recognizer 1580.

The recognizer 1580 also receives the signaling link 1522, coupling it, as described before, to "Recognize" button 1514 and "Dial" button 1516.

The architecture of FIG. 11 supports basic operations of speech recognition and speech synthesis, as is now described.

Speaker-independent and speaker-dependent speech recognition may be implemented by a suitable software program stored in ROM 1610, such as the speech recognition programs described above. The ROM 1610 also stores the speech parameters of the speaker-independent recognition. To perform speech recognition, audio samples fed to the recognizer 1580 from the CODEC 1570 are analyzed by the DSP's program. Preferably, a plurality of ROMs 1610 are provided as replacement components, each of the replacement ROMs being operative to recognize and synthesize a different language.

The telephone number memory 1620 stores speech templates of the speaker-dependent recognition process which are acquired during a training process. During the training process, a user, typically the local communicant, speaks specific words and phrases, and the DSP converts the spoken samples into parametric templates.

Text to speech synthesis is performed by a suitable software program, such as the text-to-speech synthesis program described above, which may be stored in ROM 1610, along with rules and dictionaries necessary for producing accurate pronunciation. Preferably, as described above, a plurality of ROMs 1610 are provided as replacement components, each of the replacement ROMs being operative to recognize and synthesize a different language.

To perform speech synthesis, the recognizer 1580 applies the speech synthesis program, rules and dictionaries to desired text, generating audio speech samples, which are fed to CODEC 1570. The recognizer 1580 is also capable of generating standard DTMF digits, for performing outgoing dial operation, for example, using the DTMF generation software program described above.

Although in the illustrated embodiment, speech recognition and speech synthesis are implemented in a microprocessor based design which is separate from the cordless telephone base circuits 1500, this need not be the case. Alternatively, for example, speech recognition and synthesis may be implemented by means of commercially available integrated circuits (ICs), merged with the telephone base circuits 1500. IC based implementation may reduce hardware cost but is less flexible for changing languages. Another alternative is a mixed methods design, where microprocessor based and IC based circuits are intermixed.

Recognition of spoken telephone numbers in the course of a telephone conversation and automatic dialing of the stored recognized telephone number may be similar to recognition and dialing as described above with reference to the fixed telephone accessory device of FIG. 10.

It is appreciated that the cordless-telephone embodiment of FIG. 11 can be modified to store more than one telephone number, to manage lists of more than one telephone number, to record spoken telephone number-identifying titles, and to accept voice commands from the local communicant, all as described above with reference to the cellular or mobile telephone embodiment of FIGS. 1–8.

The cordless-telephone embodiment of FIG. 11, as illustrated, is based on DTMF dialing. However, alternatively, any other dialing method may be employed, such as pulse dialing. Conventional methods for handling pulse dialing are described, for example, in Electronic Engineers' Handbook, Fink, D. G. and Christiansen, D., 2nd Ed., McGraw-Hill, New York.

Figure 12:
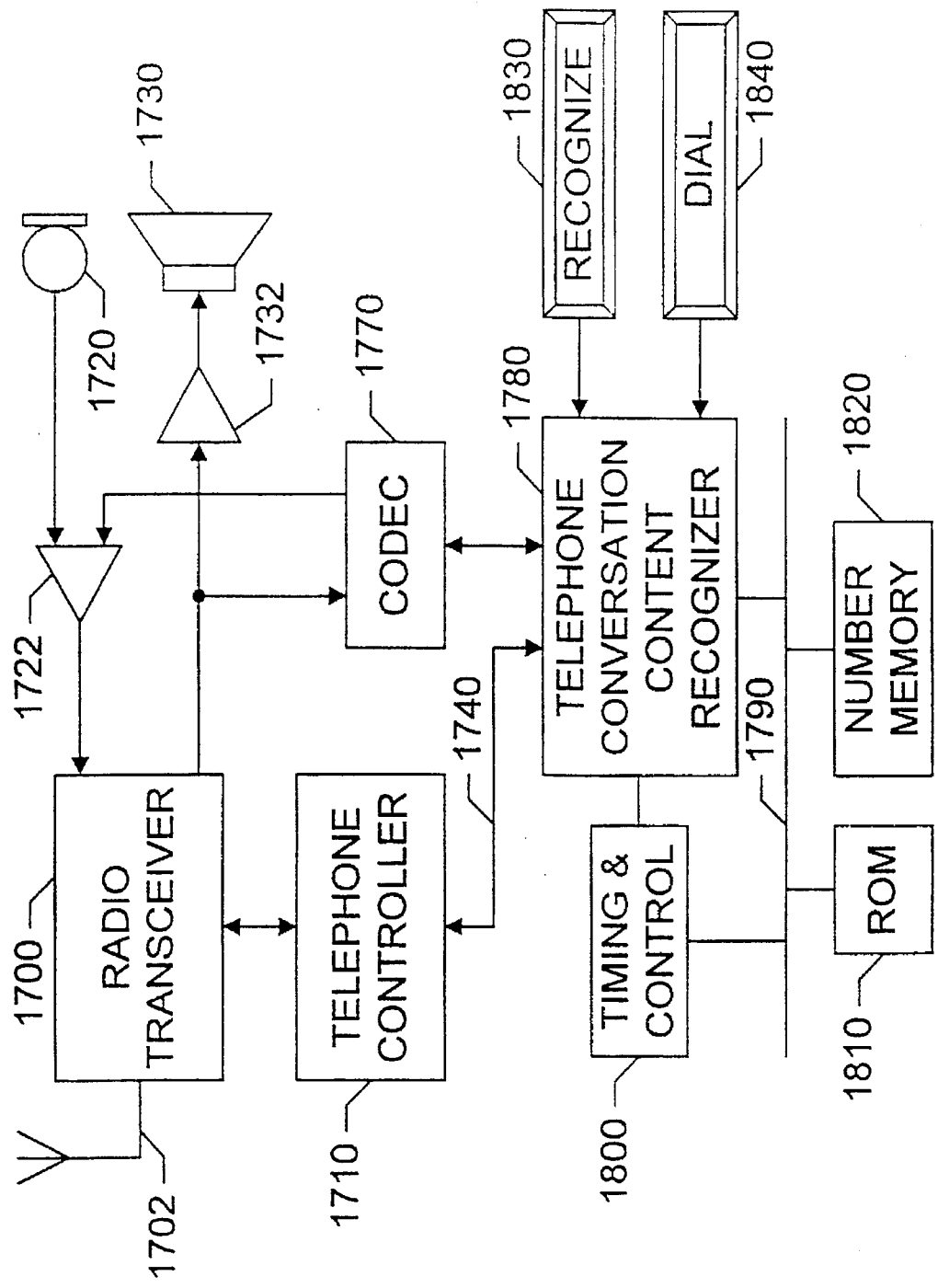
FIG. 12 is a simplified functional block diagram of multifunctional one-piece (i.e. entirely handheld) cellular or mobile telephone apparatus, constructed and operative in accordance with a preferred embodiment of the present invention.

FIG. 12 is a simplified functional block diagram of multifunctional one-piece (i.e. entirely handheld) cellular or mobile telephone apparatus, constructed and operative in accordance with a preferred embodiment of the present invention, which is preferably operative to perform the following functions:

a. recognizes at least one telephone number spoken in the course of a telephone conversation between a remote communicant and the local communicant. Recognition of the telephone number/s may be either speaker dependent or speaker independent. Preferably, the apparatus of FIG. 12 is also operative to confirm a spoken telephone number by reproducing the recognized telephone number;

b. stores the recognized telephone number; and c. retrieves the telephone number and automatically dials the retrieved number.

The apparatus of FIG. 12 comprises a cellular or mobile radio transceiver 1700 with an antenna 1702, connected to a telephone controller 1710, a microphone 1720, a mixer-amplifier 1722, a loudspeaker 1730, an amplifier 1732 and a coder/decoder 1770. Two audio channels are operative in the apparatus of FIG. 12: a receiving audio channel and a transmitting audio channel. The receiving channel is connected to loudspeaker 1730 via amplifier 1732, and to coder/decoder 1770. The transmitting channel is connected to microphone 1720 and to coder/decoder 1770 via mixer-amplifier 1722. The CODEC 1770 is connected to telephone conversation content recognizer 1780.

The receiving audio channel transfers an audio signal representing the contents of speech generated by the remote communicant from the radio transceiver 1700 to loudspeaker 1730 via amplifier 1732. The signal is also supplied to the analog input port of CODEC 1770. The CODEC 1770 performs analog to digital conversion by sampling the signal typically 8000 times per second. The digital samples are output from the CODEC to the recognizer 1780.

The transmitting audio channel transfers an audio signal, representing the contents of speech generated by the local communicant by means of microphone 1720 and mixer-amplifier 1722, to the radio transceiver 1700. The audio signal generated by the analog output port of CODEC 1770 is also supplied to the transmitting channel via mixer-amplifier 1722. The CODEC 1770 receives digital audio samples from the recognizer 1780, typically at 8000 samples per second.

The telephone controller 1710 is also attached to an integral keypad and display (not shown), and to a bidirectional control bus 1740.

The telephone conversation content recognizer 1780, which may be implemented by a suitably programmed DSP (digital signal processor), is operative to recognize spoken telephone numbers, preferably telephone numbers spoken in a plurality of languages. The DSP performs speaker independent or speaker dependent recognition, generates confirming beeps, and synthesizes speech. The recognizer 1780 is coupled, via a standard address, data and control bus 1790, to:

a. Timing and control circuitry 1800 including crystal oscillators and logic circuits which generates clock signals for the recognizer 1780 and for the bus 1790, and address decoding signals for the ROM 1810 and number memory 1820.

b. A read-only memory (ROM) 1810 which accommodates software programs performed by the recognizer 1780. ROM 1810 also typically stores speaker independent voice recognition parameters of at least the digits 0–9 and preferably of predetermined command words and of alphanumeric characters other than digits.

c. A number memory 1820, implemented by a random-access memory (RAM), that stores recognized telephone numbers, speaker dependent voice templates and serves programs run on the recognizer 1780.

The recognizer 1780 is also coupled to a bidirectional control bus 1740, and to a "Recognize" button 1830 and a "Dial" button 1840 which are part of the telephone keypad.

The architecture of FIG. 12 supports basic operations of speech recognition and speech synthesis, as is now described.

Speaker-independent and speaker-dependent speech recognition may be implemented by a suitable software program stored in ROM 1810, such as the speech recognition programs described above. The ROM 1810 also stores the speech parameters of the speaker-independent recognition. To perform speech recognition, audio samples fed to the recognizer 1780 from the CODEC 1770 are analyzed by the DSP's program. Preferably, a plurality of ROMs 1810 are provided as replacement components, each of the replacement ROMs being operative to recognize and synthesize a different language.

The telephone number memory 1820 stores speech templates of the speaker-dependent recognition process which are acquired during a training process, in the course of which a user speaks specific words and phrases, and the DSP converts the spoken samples into parametric templates.

Text to speech synthesis is performed by a suitable software program, such as the text-to-speech synthesis program described above, which may be stored in ROM 1810, along with rules and dictionaries necessary for producing accurate pronunciation. Preferably, as described above, a plurality of ROMs 1810 are provided as replacement components, each of the replacement ROMs being operative to recognize and synthesize a different language.

To perform speech synthesis, the recognizer 1780 applies the speech synthesis program, rules and dictionaries to a desired text, generating audio speech samples, which are fed to CODEC 1770. The recognizer 1780 is also capable of generating standard DTMF digits, for performing an outgoing dial operation.

Although in the illustrated embodiment, speech recognition and speech synthesis are implemented in a microprocessor based design which is separate from the cellular or mobile telephone transceiver 1700 and controller 1710 circuits, this need not be the case. Alternatively, for example, speech recognition and synthesis can be implemented by means of commercially available integrated circuits (ICs), merged with the telephone circuits. IC based implementation may reduce hardware cost but is less flexible for changing languages. Another alternative is a mixed methods design, where microprocessor based and IC based circuits are intermixed.

Recognition of spoken telephone numbers in the course of a telephone conversation may be similar to recognition as described above with reference to the fixed telephone accessory device of FIG. 10.

Automatic dialing of the stored recognized telephone number is performed as follows:

a. The user depresses dial button 1840.

b. Recognizer 1780 checks the number memory 1320. If there is no recognized number, recognizer 1780 remains idle. Otherwise, recognizer 1780 dials the number contained in number memory 1820 by sending OFF-HOOK and DIAL commands to telephone controller 1710 via bidirectional control bus 1740. Dial operation terminates and the call which has been set up is conducted, unless a "busy" or "no-answer" signal is encountered.

It is appreciated that the entirely handheld cellular or mobile telephone embodiment of FIG. 12 can be modified to store more than one telephone number, to manage lists of more than one telephone number, to record spoken telephone number-identifying titles, and to accept voice commands from the local communicant, all as described above with reference to the cellular-telephone embodiment of FIGS. 1–8.

Figure 13:
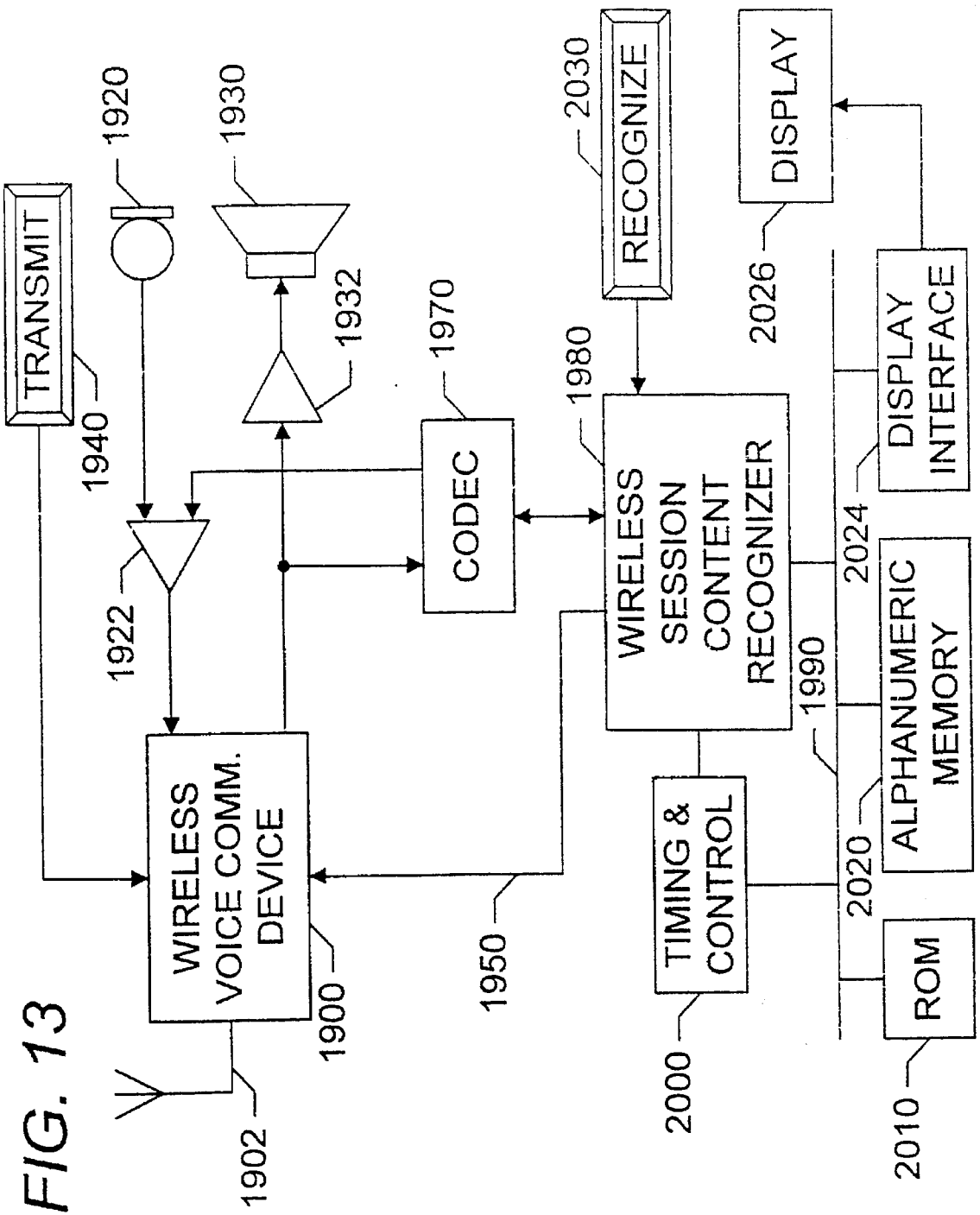
FIG. 13 is a simplified functional block diagram of multifunctional non-telephone wireless communication apparatus, constructed and operative in accordance with a preferred embodiment of the present invention.

FIG. 13 is a simplified functional block diagram of multifunctional non-telephone wireless communication apparatus, constructed and operative in accordance with a preferred embodiment of the present invention, which is preferably operative to perform the following functions:

a. recognizes alphanumeric information spoken in the course of a wireless communication session between a remote communicant and the local communicant. Recognition of the alphanumeric information may be either speaker dependent or speaker independent. Preferably, the apparatus of FIG. 13 is also operative to confirm spoken information by reproducing the recognized letters and digits;

b. stores the recognized information; and c. displays the recognized information on an alphanumeric display.

The apparatus of FIG. 13 comprises a wireless voice communication device 1900 with an antenna 1902, connected to a microphone 1920, a mixer-amplifier 1922, a loudspeaker 1930, an amplifier 1932 and a coder/decoder 1970. Two audio channels are operative in the apparatus of FIG. 13: a receiving audio channel and a transmitting audio channel. The receiving channel is connected to a loudspeaker 1930 via an amplifier 1932, and to a coder/decoder 1970. The transmitting channel is connected to a microphone 1920 and a coder/decoder 1970 via a mixer-amplifier 1922. The CODEC 1970 is connected to a wireless communication session content recognizer 1980.

The receiving audio channel transfers an audio signal representing the contents of speech generated by the remote communicant from the wireless device 1900 to the loudspeaker 1930 via amplifier 1932. The signal is also supplied to the analog input port of CODEC 1970. The CODEC 1970 performs analog to digital conversion by sampling the signal typically 8000 times per second. The digital samples are output from the CODEC to the recognizer 1980.

The transmitting audio channel transfers an audio signal representing the contents of speech generated by the local communicant at microphone 1920 and mixer-amplifier 1922 to the wireless device 1900. The audio signal generated by the analog output port of CODEC 1970 is also supplied to the transmitting channel via mixer-amplifier 1922. The CODEC 1970 receives digital audio samples from the recognizer 1980, typically at 8000 samples per second.

The wireless device 1900 is also typically coupled to a "Transmit" button 1940, mounted on the microphone 1920, in response to which the device switches into transmit mode. The wireless device 1900 is also coupled to a transmit command link 1950, enabling the recognizer 1980 to switch the device into transmit mode. Alternatively, a Voice Operated Switch (VOX) may be employed by the device 1900 for the same functionality; in that case the button 1940 and command link 1950 are not needed.

The wireless session content recognizer 1980, implemented by a DSP (digital signal processor), is operative to recognize spoken alphanumeric information, typically a limited vocabulary of alphanumeric combinations, including letters, keywords and/or digits spoken in a plurality of languages. The DSP performs speaker independent or speaker dependent recognition, generates confirming beeps, and synthesizes speech.

The recognizer 1980 is coupled, via a standard address, data and control bus 1990, to:

a. Timing and control circuitry 2000 including crystal oscillators and logic circuits which generates clock signals for the recognizer 1980 and for the bus 1990, and address decoding signals for the ROM 2010, alphanumeric memory 2020 and a display interface 2024.

b. A read-only memory (ROM) 2010 that accommodates software programs performed by the recognizer 1980. ROM 2010 also typically stores speaker independent voice recognition parameters of at least the letters a–z, the digits 0–9 and preferably of predetermined command words and of other alphanumeric symbols.

c. An alphanumeric memory 2020, implemented by a random-access memory (RAM), which stores recognized alphanumeric information, speaker dependent voice templates and serves programs run on the recognizer 1980.

d. A display interface 2024 which typically comprises a commercially available display driver, attached to display 2026, such as an LCD or fluorescent standard display, for displaying recognized alphanumeric information.

The recognizer 1980 is also coupled to a user-accessible "Recognize" button 2030, mounted on the communication device.

The architecture of FIG. 13 supports basic operations of speech recognition and speech synthesis, as is now described.

Speaker-independent and speaker-dependent speech recognition may be implemented by a suitable software program stored in ROM 2010. A suitable speaker-dependent speech recognition program has been described above. An example of a suitable speaker-independent speech recognition program is a standard DSP building block program by Voice Control Systems entitled "Speaker-independent alphabet and alphanumeric speech recognition". The ROM 2010 also stores the speech parameters of the speaker-independent speech recognition. To perform speech recognition, audio samples fed to the recognizer 1980 from the CODEC 1970 are analyzed by the DSP's program. Preferably, a plurality of ROMs 2010 are provided as replacement components, each of the replacement ROMs being operative to recognize and synthesize a different language.

The alphanumeric memory 2020 stores speech templates of the speaker-dependent speech recognition process which are acquired during a training process, in the course of which a user speaks specific words and phrases, and the DSP converts the spoken samples into parametric templates.

Text to speech synthesis is performed by a suitable software program, such as the text-to-speech synthesis program described above, which may be stored in ROM 2010, along with rules and dictionaries necessary for producing accurate pronunciation. Preferably, as described above, a plurality of ROMs 2010 are provided as replacement components, each of the replacement ROMs being operative to recognize and synthesize a different language.

To perform speech synthesis, the recognizer 1980 applies the speech synthesis program, rules and dictionaries to desired text, generating audio speech samples, which are fed to CODEC 1970.

Although in the illustrated embodiment, speech recognition and speech synthesis are implemented in a microprocessor based design which is separate from the wireless communication device 1900, this need not be the case. Alternatively, for example, speech recognition and synthesis can be implemented by means of commercially available integrated circuits (ICs), merged with the device circuits. IC based implementation may reduce hardware cost but is less flexible for changing languages. Another alternative is a mixed methods design, where microprocessor based and IC based circuits are intermixed.

Recognition of spoken alphanumeric information in the course of a wireless communication session may be similar to recognition of telephone numbers in the course of a telephone conversation as described above with reference to the fixed telephone accessory device of FIG. 10 except as now described. When the recognizer 1980 confirms, by speech synthesis, a recognized digit, or a "No" or "Clear" command (step 1440 or 1460 in FIG. 10), the recognizer activates the transmit command link 1950 for switching the device 1900 into transmit mode. The recognized information is displayed on the display 2026 which is configured and arranged to be visible by the local communicant.

It is appreciated that the non-telephone wireless embodiment of FIG. 13 can be modified to store more than one alphanumeric information item, each item including one or more alphanumeric characters, to manage lists of more than one alphanumeric information items, to record spoken alphanumeric information item-identifying titles, and to accept voice commands from the local communicant, all as described above with reference to the cellular or mobile telephone embodiment of FIGS. 1–8.

It is appreciated that the apparatus of FIG. 13 is useful for a broad variety of non-telephone communication applications such as but not limited to dispatch systems.

Figure 14:
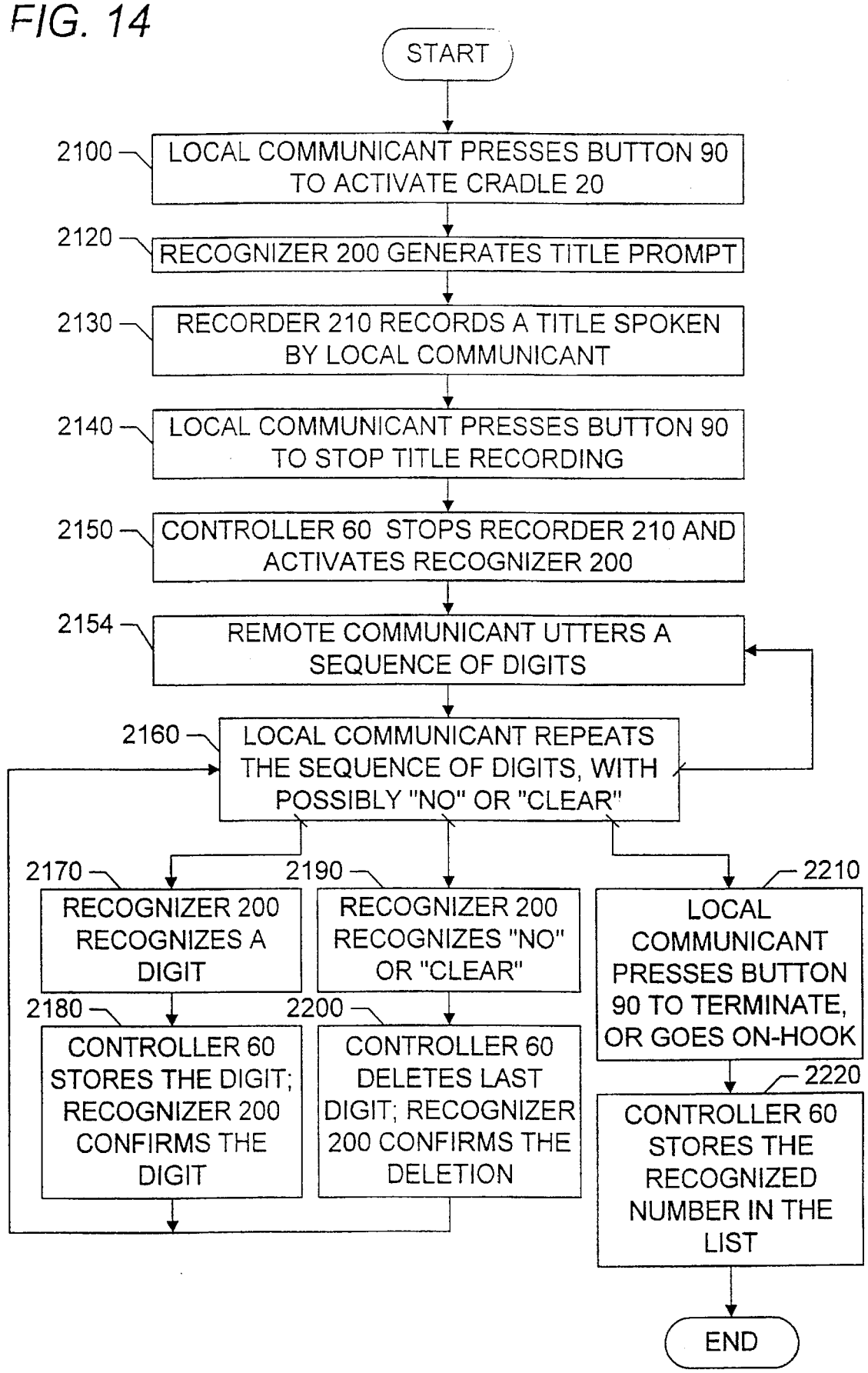
FIG. 14 is a simplified flowchart illustration of a method for communicating telephone numbers or other alphanumeric information from a remote communicant to a local communicant.

Reference is now made to FIG. 14, which is a simplified flowchart illustration of a method for communicating telephone numbers or other alphanumeric information from a remote communicant to a local communicant. Although the illustrated embodiment uses the reference numbers of FIGS. 1–4 for clarity, it is appreciated that the method of FIG. 14 is not applicable only to the embodiment of FIGS. 1–4 but alternatively may be employed for any of the embodiments of FIGS. 9–19.

Operation begins when the local communicant (the user) is engaged in normal telephone conversation, and the remote communicant wishes to convey a telephone number to him. The local communicant depresses the driver accessible activation button 90 (step 2100). Alternatively, the local communicant may generate a voice command, for example: "Take number" (not shown).

Controller 60 senses the depression of button 90 by receiving an indication from keypad interface 460, and sends a speech synthesis command to recognizer 200 via system bus 420 and DPR 330 for uttering title prompt (for example: "Please say the caller's name"). Recognizer 200 sends the spoken prompt to loudspeaker 40 (step 2120). Controller 60 then sends a RECORD command to recorder 210 via system bus 420 and DPR 370, in order to record the title uttered by the user. The command typically contains a unique index number generated by controller 60.

The local communicant utters a title for the telephone number (for example: "John Smith"). Recorder 210 receives the spoken title from microphone 30 (step 2130). Recorder 210 compresses the speech and stores the compressed information in title field 540 of title and message memory 380. The local communicant terminates title recording by depressing button 90 again (step 2140). Controller 60 stops title recording by sending a STOP command to recorder 210, and sends a LISTEN command to recognizer 200 (step 2150). Recognizer 200 continuously receives digital samples of the local communicant voice, searching for spoken digits.

The remote communicant utters the telephone number (step 2154), in whole or in part (for example: "456" for the first 3 digits of the number). The local communicant repeats the sequence, digit by digit (step 2160).

Referring to step 2160, four events may occur:

a. If recognizer 200 recognizes a spoken digit (step 2170), it sends the digit to controller 60 via DPR 330 and system bus 420. Controller 60 temporarily stores the digit in an internal digit memory array (not shown), and sends a digit speech synthesis command to recognizer 200 for confirming the recognized digit (step 2180). Alternatively, the audible confirmation may include only a short beep. The cradle or adapter returns to step 2160.

b. If recognizer 200 recognizes spoken "no" or "clear" words (step 2190), uttered by local communicant in response to digit confirmation to indicate that the last digit was an error, controller 60 removes the last digit from the digits memory array and sends a "canceled" speech synthesis command to recognizer 200 (step 2200). The cradle or adapter returns to step 2160.

c. If the local communicant has finished uttering the sequence of digits and asks the remote communicant for the next part of the number, he returns to step 2154, for example by telling the remote communicant to "go ahead".

d. If the local communicant wishes to terminate, he depresses button 90 or goes on-hook (step 2210). Controller 60 writes the recognized number (if any) to number field 520 in data structure 500, along with the index number in index field 510 (step 2220). The operation ends.

Preferably, the stored telephone number or other alphanumeric information is later retrieved and automatically dialed, as described above with reference to FIG. 6, or displayed or otherwise employed.

Figure 15:
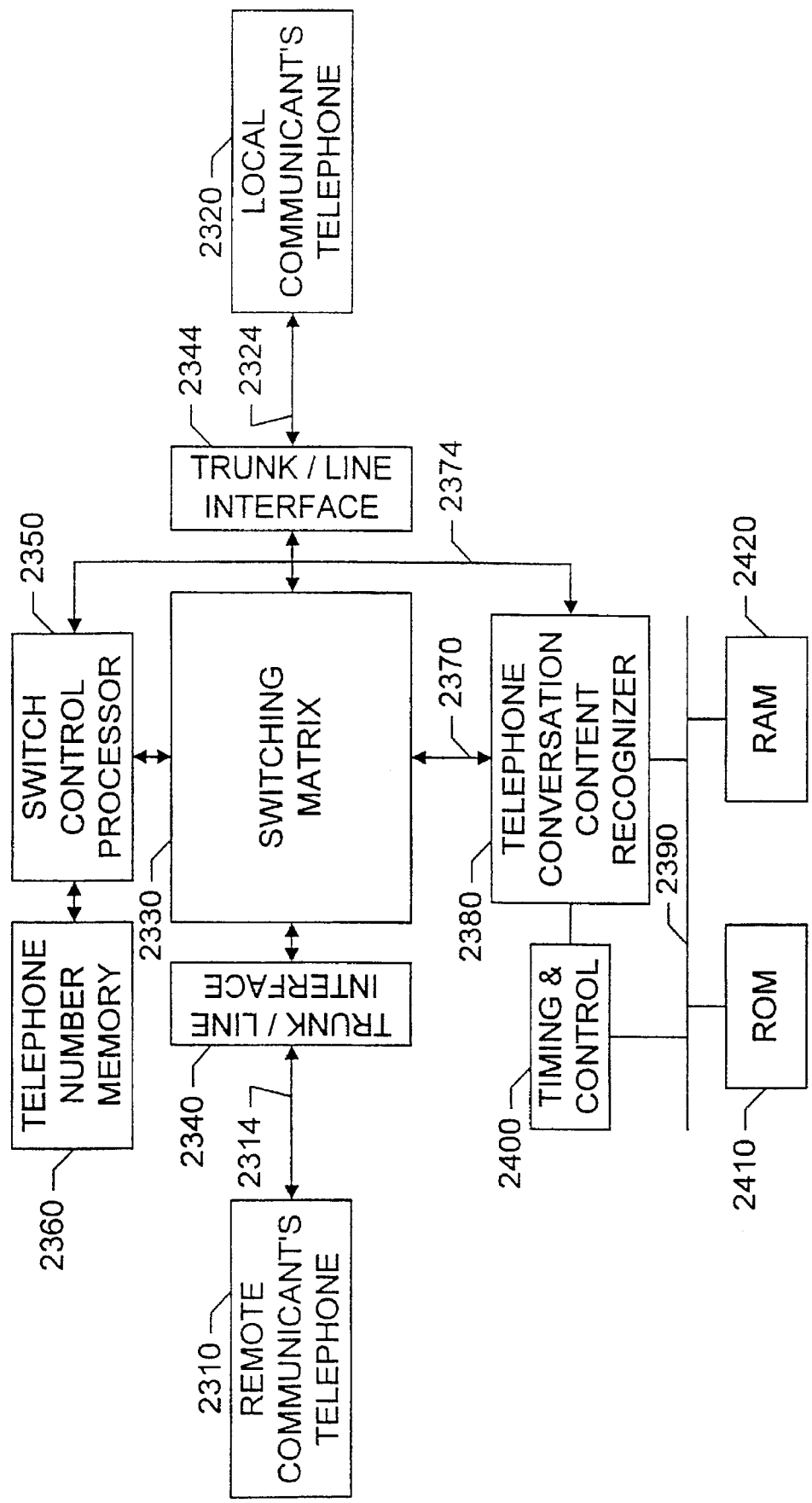
FIG. 15 is a simplified functional block diagram of a central office switch accessory device, constructed and operative in accordance with a preferred embodiment of the present invention and associated with a fixed or cellular (mobile) central office switch.

FIG. 15 is a simplified functional block diagram of a central office switch accessory device, constructed and operative in accordance with a preferred embodiment of the present invention and associated with a fixed or cellular (mobile) central office switch. The accessory device of FIG. 15 is preferably operative to perform the following functions:

a. recognizes at least one telephone number spoken in the course of a telephone conversation between a remote communicant and a local communicant. Recognition of the telephone number/s may be either speaker dependent or speaker independent. Preferably, the apparatus of FIG. 15 is also operative to confirm a spoken telephone number by reproducing the recognized telephone number;

b. stores the recognized telephone number; and c. retrieves the telephone number and automatically dials the retrieved number.

The apparatus of FIG. 15 comprises a remote communicant's telephone instrument 2310 connected to a local communicant's telephone instrument 2320 via telephone links 2314 and 2324, a central office switching matrix 2330 and matrix interfaces 2340 and 2344. The type of each of the telephone links 2314 and 2324 and of the interfaces 2340 and 2344 depend on the type of the remote or local telephone instruments 2310 and 2320, and may, for example, be as follows:

a. If the remote or local telephone instrument comprises a fixed telephone connected directly to the central office switch, then its link is a local loop line, interfaced to matrix 2330 by means of a line interface 2340 or 2344;

b. If the remote or local telephone instrument comprises a fixed telephone connected to the central office switch via a transit exchange, its link is an inter-exchange trunk, interfaced to matrix 2330 by means of a trunk interface 2340 or 2344;

c. If the remote or local telephone instrument comprises a mobile telephone, its link comprises wireless and wireline channels, routed to a trunk that is interfaced to matrix 2330 by means of a trunk interface 2340 or 2344.

The central office switch is further equipped with a switch control processor 2350, capable of sending switching commands to matrix 2330 and receiving status and control information from matrix 2330 and trunk/line interfaces 2340 and 2344, and a telephone number memory 2360 coupled to the processor 2350. The telephone number memory 2360, implemented by a random-access memory (RAM), stores telephone numbers recognized by a telephone conversation content recognizer 2380, which is connected to matrix 2330 via a digital PCM link 2370. The recognizer 2380 is also connected to processor 2350 via a command and control link 2374.

Preferably, multiple recognizers are employed in one central office switch for handling multiple telephone conversations concurrently. All recognizers are coupled to matrix 2330 and processor 2350 as described above. For simplicity, FIG. 15 and the following explanations refer to only a single recognizer 2380.

Two audio channels are operative in the apparatus of FIG. 15: a first, receiving audio channel and a second, transmitting audio channel. The first, receiving audio channel transfers an audio signal representing the contents of speech generated by the remote communicant from the telephone 2310, via matrix 2330, to local telephone 2320. The second, transmitting audio channel transfers an audio signal representing the contents of speech generated by the local communicant from the telephone 2320, via matrix 2330, to the telephone 2310.

The audio signal originating from the remote communicant and traveling over the first audio channel can also be supplied to the recognizer 2380 via PCM link 2370, by issuing an appropriate switching command to the matrix 2330. The recognizer 2370 recognizes telephone numbers within this audio information.

The audio signal generated by the recognizer 2380, e.g. confirmation words generated in response to recognized digits, can be supplied, via PCM link 2370 and the second audio channel, to the remote communicant, by issuing an appropriate switching command to matrix 2330. The switching of the second audio channel may be either exclusive, i.e. the remote communicant receives the audio from PCM link 2370 alone, or inclusive, i.e. the remote communicant receives an audio summed up from both the PCM link 2370 and local communicant's link 2324. In inclusive switching, conference call circuitry needs to be provided in the matrix 2330, but the local communicant is kept "on line" while the recognizer 2370 sends confirmation words to the remote communicant.

The audio signal originating from the local communicant and traveling over the second audio channel can also be supplied to the recognizer 2380 via PCM link 2370, by issuing an appropriate switching command to the matrix 2330. The recognizer 2370 recognizes speaker dependent or speaker independent telephone numbers and voice commands within this audio information.

The audio signal generated by the recognizer 2380, e.g. confirmation words generated in response to voice commands and recognized digits, can be supplied, via PCM link 2370 and the first audio channel, to the local communicant, by issuing an appropriate switching command to matrix 2330. The switching of the first audio channel may be either exclusive, i.e. the local communicant receives the audio from PCM link 2370 alone, or inclusive, i.e. the local communicant receives an audio summed up from both the PCM link 2370 and remote communicant's link 2314. For inclusive switching, conference call circuitry need be provided in the matrix 2330, but the remote communicant is kept "on line" while the recognizer 2370 sends confirmation words to the local communicant.

The telephone conversation content recognizer 2380, which may be implemented by a suitably programmed DSP (digital signal processor), is operative to recognize spoken telephone numbers, preferably telephone numbers spoken in a plurality of languages. The DSP performs speaker independent or speaker dependent recognition, generates confirming beeps, and synthesizes speech.

The recognizer 2380 is coupled, via a standard address, data and control bus 2390, to:

a. Timing and control circuitry 2400, including crystal oscillators and logic circuits. Circuitry 2400 generates clock signals for the recognizer 2380 and for the bus 2390, and address decoding signals for the ROM 2410 and RAM 2420.

b. A read-only memory (ROM) 2410 which accommodates software programs performed by the recognizer 2380. ROM 2410 also typically stores speaker independent voice recognition parameters of at least the digits 0–9 and preferably of predetermined command words and of alphanumeric characters other than digits.

c. A random-access memory (RAM) 2420, that stores speaker dependent voice templates and serves programs run on the recognizer 2380.

The recognizer 2380 is also connected, as described before, to processor 2350 via a command and control link 2374.

The architecture of FIG. 15 supports basic operations of speech recognition and speech synthesis, as is now described.

Speaker-independent and speaker-dependent speech recognition may be implemented by a suitable software program stored in ROM 2410, such as the speech recognition programs described above. The ROM 2410 also stores the speech parameters of the speaker-independent recognition. To perform speech recognition, audio samples fed to the recognizer 2380 from matrix 2330 are analyzed by the DSP's program. Preferably, a plurality of ROMs 2410 are provided as replacement components, each of the replacement ROMs being operative to recognize and synthesize a different language. Alternatively, the speech parameters may be stored in RAM 2420, loaded at system start up from processor 2350.

The RAM 2420 stores speech templates of the speaker-dependent recognition process which are acquired during a training process. During the training process, a user, typically the local communicant, utters specific words and phrases, and the DSP converts the spoken samples into parametric templates.

Text to speech synthesis is performed by a suitable program, such as the text-to-speech synthesis program described above, which may be stored in ROM 2410, along with rules and dictionaries necessary for producing accurate pronunciation. Preferably, as described above, a plurality of ROMs 2410 are provided as replacement components, each of the replacement ROMs being operative to recognize and synthesize a different language. Alternatively, the contents of the ROM may instead be stored in RAM 2420, loaded at system start up from processor 2350. To perform speech synthesis, the recognizer 2380 applies the speech synthesis program, rules and dictionaries to desired text, generating audio speech samples, which are fed to matrix 2330.

Although in the illustrated embodiment, speech recognition and speech synthesis are implemented in a microprocessor based design, this need not be the case. Alternatively, for example, speech recognition and synthesis may be implemented by means of commercially available integrated circuits (ICs). IC based implementation may reduce hardware cost but is less flexible for changing languages. Another alternative is a mixed methods design, where microprocessor based and IC based circuits are intermixed.

Figure 16:
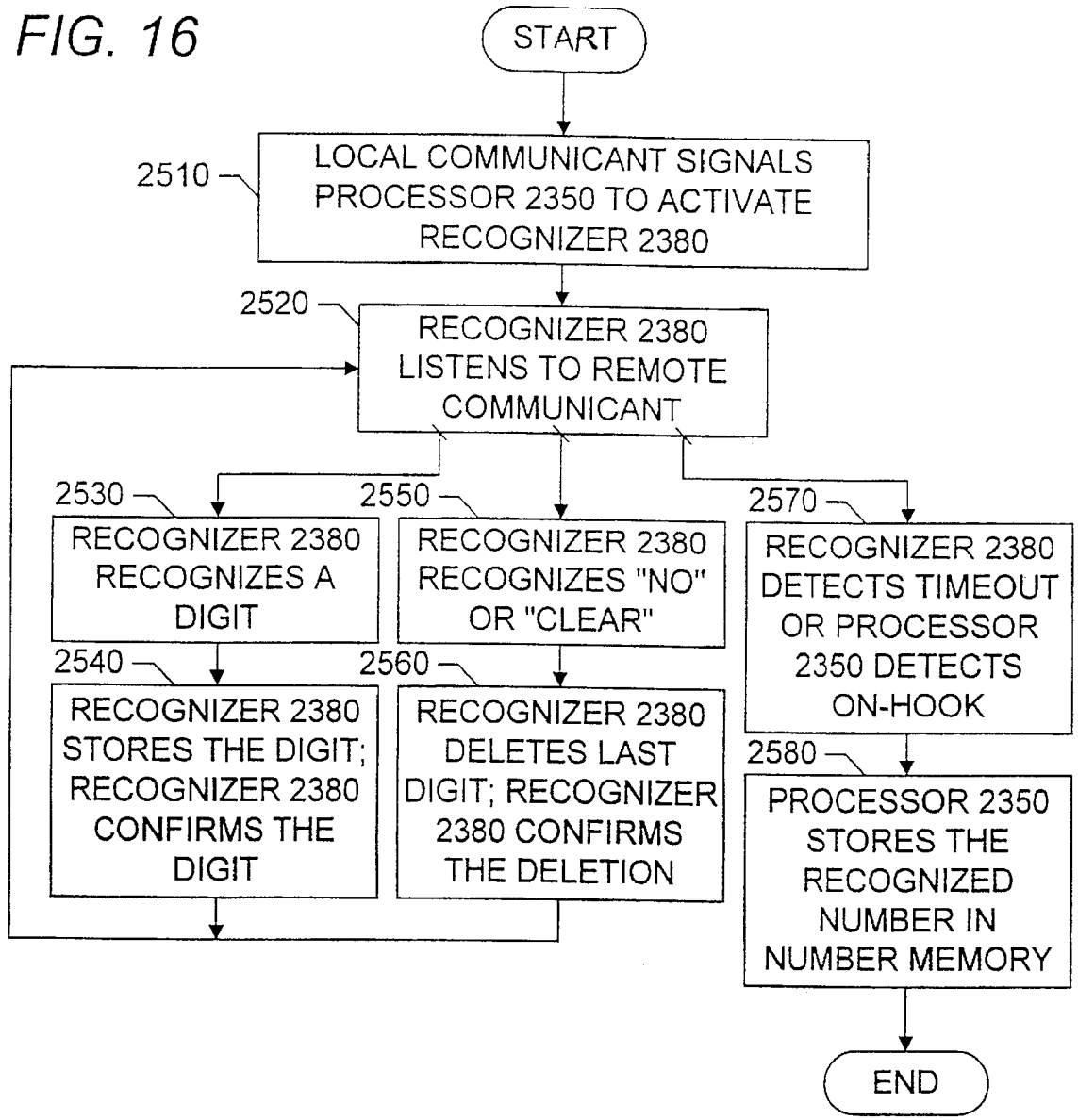
FIG. 16 is a simplified flowchart illustration of a preferred method for recognition of spoken telephone numbers in the course of a telephone conversation using the apparatus of FIG. 15.

Reference is now made to FIG. 16 which is a simplified flowchart illustration of a preferred method for recognition of spoken telephone numbers in the course of a telephone conversation using the apparatus of FIG. 15.

Operation begins when the local communicant (the user) is engaged in normal telephone conversation, and the remote communicant wishes to convey a telephone number to her. The local communicant signals the switch control processor 2350 to activate recognizer 2380 (step 2510). Signaling may be effected by depressing the telephone's hookswitch, by depressing a specific key in a cellular or mobile phone's keypad, or by any other suitable method. Processor 2350 receives the signal, designates one of the recognizers of the central office switch for the telephone conversation, and commands recognizer 2380 to start listening to the remote communicant, searching for spoken digits (step 2520).

Referring to step 2520, three events may occur:

a. If recognizer 2380 recognizes a spoken digit (step 2530), it stores the digit in a temporary digit array in RAM 2420 and generates an oral representation of the digit for confirming the recognized digit (step 2540). Alternatively, the audible confirmation may contain just a short beep. The recognizer returns to step 2520.

b. If recognizer 2380 recognizes spoken "no" or "clear" words (step 2550), uttered by remote communicant in response to digit confirmation to indicate that the last digit was an error, recognizer 2380 removes the last digit from the digit array and generates a "cancelled" speech synthesis, i.e. an oral representation of the word "cancelled" (step 2560). The recognizer returns to step 2520.

c. If recognizer 2380's inter-digit timer (not shown) expires (step 2570), or receives a STOP command from processor 2350 due to on-hook condition sensed by interface 2340 or 2344, it sends the recognized number (if any) to processor 2350, and stops listening (step 2580). Alternatively, the inter-digit timer may be omitted or may be set for a very long time period and the remote communicant may indicate, by means of a "stop" voice command, that all digits of the telephone number have been spoken. The processor 2350 stores the recognized number in the number memory 2360 along with a unique ID of the local communicant (e.g. her telephone number). The operation ends, and the recognizer is free for reallocation to another session.

Automatic dialing of the stored recognized telephone number is performed as follows:

a. The user lifts off the handset of the telephone 2320 and signals the switch control processor 2350 to automatically dial the previously recognized number. Signaling may be done by dialing a specific code, by depressing a specific key in the keypad of a cellular or mobile telephone's keypad, or by other suitable method.

b. Processor 2350 checks the number memory 2360 according to the unique ID of the user. If no telephone number has been recognized and stored for the requesting user, processor 2350 commands the matrix 2330 to generate a suitable error tone. Otherwise, processor 2350 performs a normal call set up operation to the target number retrieved from number memory 2360. The call which has been set up is conducted, unless a "busy" or "no-answer" signal is encountered.

It is appreciated that the embodiment of FIG. 15 can be modified to store more than one telephone number per user, to manage lists of more than one telephone number, to record spoken telephone number-identifying titles, and to accept voice commands from the local communicant, all as described above with reference to the cellular or mobile telephone embodiment of FIGS. 1–8. The telephone number memory 2360 can be enlarged by using secondary memory devices like magnetic disks.

Figure 17:
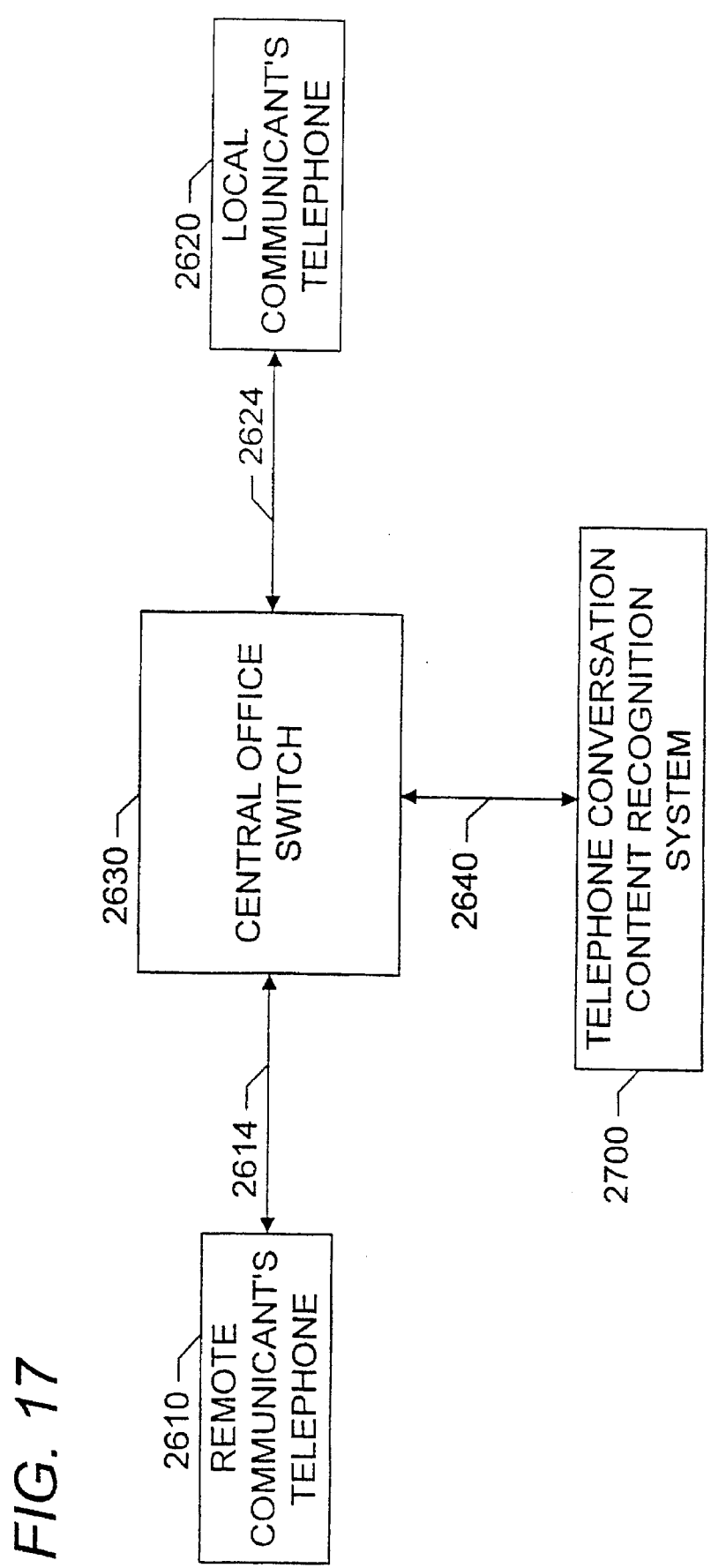
FIG. 17 is a simplified functional block diagram of a telephone conversation content recognition system, constructed and operative in accordance with a preferred embodiment of the present invention and associated with a fixed or cellular (mobile) central office switch.

FIG. 17 is a simplified functional block diagram of a telephone conversation content recognition system, constructed and operative in accordance with a preferred embodiment of the present invention and associated with a fixed or cellular (mobile) central office switch. The telephone conversation content recognition system of FIG. 17 is preferably operative to perform the following functions:

a. recognizes at least one telephone number spoken in the course of a telephone conversation between a remote communicant and a local communicant. Recognition of the telephone number/s may be either speaker dependent or speaker independent. Preferably, the apparatus of FIG. 17 is also operative to confirm a spoken telephone number by reproducing the recognized telephone number;

b. stores the recognized telephone number; and c. retrieves the telephone number and automatically dials the retrieved number.

The apparatus of FIG. 17 comprises a remote communicant's telephone instrument 2610 connected to a local communicant's telephone instrument 2620 via telephone links 2614 and 2624 and a central office switch 2630. The type of each of the telephone links 2614 and 2624 depend on the type of the remote or local telephone instruments 2610 and 2620, and specifically:

a. If the remote or local telephone instrument comprises a fixed telephone connected directly to the central office switch, its link is a local loop line.

b. If the remote or local telephone instrument comprises a fixed telephone connected to the central office switch via a transit exchange, its link is an inter-exchange trunk.

c. If the remote or local telephone instrument comprises a mobile telephone, its link comprises wireless and wireline channels, routed to a trunk coupled to the switch.

The central office switch is also connected to an adjunct telephone conversation content recognition system 2700, via trunk 2640. The trunk is typically capable of handling 24 or 30 voice channels concurrently. Preferably, multiple trunks are employed in one central office switch for connecting more than 24 or 30 telephone conversations to the recognition system 2700. Additionally, one recognition system 2700 may be coupled to several central office switches via multiple trunks. For simplicity, the following figures and explanations refer to a single trunk 2640, coupling the recognition system 2700 to only a single switch 2630.

Figure 18:
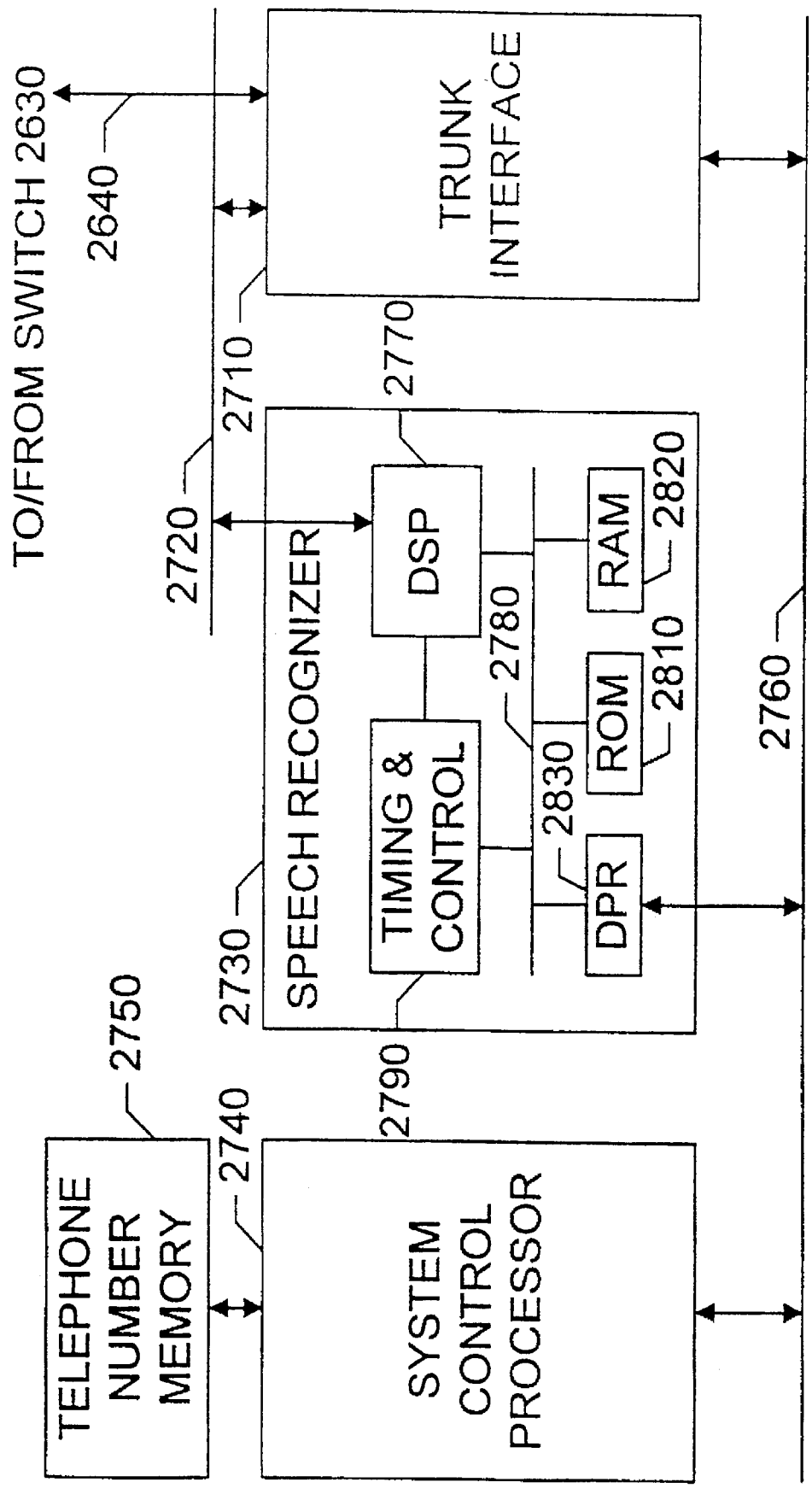
FIG. 18 is a simplified functional block diagram of the telephone conversation content recognition system of FIG. 17, constructed and operative in accordance with a preferred embodiment of the present invention.

FIG. 18 is a simplified functional block diagram of telephone conversation content recognition system 2700 of FIG. 17, constructed and operative in accordance with a preferred embodiment of the present invention. Referring now to FIG. 18, the recognition system 2700 of FIG. 17 comprises:

a. a trunk interface 2710 connected to a PCM bus 2720. The trunk interface 2710 couples the external trunk 2640 and the internal PCM bus 2720;

b. a speech recognizer 2730;

c. a system control processor 2740;

d. a telephone number memory 2750 coupled to the processor 2740. The telephone number memory 2750, implemented by a random-access memory (RAM), stores telephone numbers recognized by the speech recognizer 2730; and e. a system bus 2760, which couples the processor 2740 to the recognizer 2730 and trunk interface 2710, enabling the processor 2740 to command and control the system.

The apparatus of FIG. 18 may, for example, be based on a suitably programmed and suitably modified conventional voice mail system or IVR (interactive voice response) system.

Preferably, multiple trunk interfaces and multiple speech recognizers are employed in one system for handling multiple telephone conversations concurrently. For simplicity, FIG. 18 and the following explanations refer to only a single recognizer 2730 and a single trunk interface 2710.

Two audio channels are operative in the apparatus of FIGS. 17–18: a first, receiving audio channel and a second, transmitting audio channel. The first, receiving audio channel transfers an audio signal representing the contents of speech generated by the remote communicant from the telephone 2610, via switch 2630, to local telephone 2620. The second, transmitting audio channel transfers an audio signal representing the contents of speech generated by the local communicant from the telephone 2620, via switch 2630, to the telephone 2610.

The audio signal originating from the remote communicant and traveling over the first audio channel can also be supplied to the recognizer 2680 via trunk 2640, by performing an appropriate switching operation in the switch 2630. The recognition system 2700 recognizes telephone numbers within this audio information. The audio signal generated by the system 2700, e.g. confirmation words generated in response to recognized digits, can be supplied, via trunk 2640, to the remote communicant, traveling along the second audio channel, by performing an appropriate switching operation in the switch 2630.

The switching of the second audio channel may be either exclusive, i.e. the remote communicant receives the audio from trunk 2640 alone, or inclusive, i.e. the remote communicant receives an audio summed up from both the trunk 2640 and local communicant's link 2624. For inclusive switching, conference call circuitry need be provided in the switch 2630, but the local communicant is kept "on line" while the recognition system 2700 sends confirmation words to the remote communicant.

The audio signal originating from the local communicant and traveling over the second audio channel can also be supplied to the recognition system 2700 via trunk 2640, by performing an appropriate switching operation in the switch 2630. The system 2700 may recognize speaker dependent or speaker independent telephone numbers and voice commands from this audio information. The audio signal generated by the recognition system 2700, confirmation words generated in response to voice commands and recognized digits, can be supplied, via trunk 2640 and the first audio channel, to the local communicant, by performing an appropriate switching operation in the switch 2630.

The switching of the first audio channel may be either exclusive, i.e. the local communicant receives the audio from trunk 2640 alone, or inclusive, i.e. the local communicant receives an audio summed up from both the trunk 2640 and remote communicant's link 2614. If switching is inclusive, conference call circuitry must be provided in the switch 2630, however the remote communicant is kept "on line" while the recognition system 2700 sends confirmation words to the local communicant.

The speech recognizer 2730 includes a suitably programmed DSP (digital signal processor) 2770, operative to recognize spoken telephone numbers, preferably telephone numbers spoken in a plurality of languages. The DSP performs speaker independent or speaker dependent recognition, generates confirming beeps, and synthesizes speech. The DSP 2770 is coupled, via a standard address, data and control bus 2780, to:

a. Timing and control circuitry 2790, including crystal oscillators and logic circuits. The timing and control circuitry 2790 generates:
  i. clock signals for the DSP 2770 and for the bus 2780;
  ii. address decoding signals for the ROM 2810, RAM 2820 and DPR 2830; and
  iii. a wait state ("ready") signal for the DSP 2770 that coordinates its access to the DPR 2830.
b. A read-only memory (ROM) 2810 that accommodates software programs performed by the DSP 2770. ROM 2810 also typically stores speaker independent voice recognition parameters of at least the digits 0–9 and preferably of predetermined command words and of alphanumeric characters other than digits.
c. A random-access memory (RAM) 2820, that stores speaker dependent voice templates and serves programs run on the DSP 2770.
d. A dual-port RAM (DPR) 2830 which conveys data and commands between the speech recognizer 2730 and the control processor 2740. The DPR 2830 has two ports ("sides"), where the first is coupled to the bus 2780 and the second is coupled to the system bus 2760.

The architecture of FIGS. 17–18 supports basic operations of speech recognition and speech synthesis, as is now described.

Speaker-independent and speaker-dependent speech recognition may be implemented by a suitable software program stored in ROM 2810, such as the speech recognition programs described above. The ROM 2810 also stores the speech parameters of the speaker-independent recognition. To perform speech recognition, audio samples fed to the DSP 2770 from PCM bus 2720 are analyzed by the DSP's program. Preferably, a plurality of ROMs 2810 are provided as replacement components, each of the replacement ROMs being operative to recognize and synthesize a different language. Alternatively, the content of ROM 2810 may be stored in RAM 2820, loaded at system start up from processor 2740.

The RAM 2820 stores speech templates of the speaker-dependent recognition process which are acquired during a training process. During the training process, a user, typically the local communicant, utters specific words and phrases, and the DSP converts the spoken samples into parametric templates.

Text to speech synthesis is performed by a suitable program, such as the text-to-speech synthesis program described above, which may be stored in ROM 2810, along with rules and dictionaries necessary for producing accurate pronunciation. Preferably, as described above, a plurality of ROMs 2810 are provided as replacement components, each of the replacement ROMs being operative to recognize and synthesize a different language. Alternatively, the contents of ROM 2810 may be stored in RAM 2820, loaded at system start up from processor 2740. To perform speech synthesis, the DSP 2770 applies the speech synthesis program, rules and dictionaries to desired text, generating audio speech samples, which are fed to PCM bus 2720.

Although in the illustrated embodiment, speech recognition and speech synthesis are implemented in a microprocessor based design, this need not be the case. Alternatively, for example, speech recognition and synthesis may be implemented by means of commercially available integrated circuits (ICs). IC based implementation may reduce hardware cost but is less flexible for changing languages. Another alternative is a mixed methods design, where microprocessor based and IC based circuits are intermixed.

It is appreciated that the spoken telephone number recorder provided in accordance with a preferred embodiment of the present invention and serving a telephone system including a multiplicity of telephone instruments and central network equipment serving them, may be incorporated within the telephone instruments or within the central network equipment serving them, either within the central switch or an adjunct system interfacing therewith, or within any other component of the central network equipment.

Reference is now made to FIG. 19 which is a simplified flowchart illustration of a preferred method for recognition of spoken telephone numbers in the course of a telephone conversation.

Operation begins when the local communicant (the user) is engaged in normal telephone conversation, and the remote communicant wishes to convey a telephone number to her. The local communicant signals the switch 2630 to activate recognition system 2700 (step 2910). Signaling may be effected by depressing the telephone's hookswitch, by depressing a specific key in a keypad of a cellular or mobile telephone, or by other suitable method.

The switch 2630 receives the signal and connects recognition system 2700 to the receiving audio channel via trunk 2640, as described above. The switch also sends to the recognition system 2700, via trunk 2640, a unique ID of the local communicant (e.g. her telephone number), by a suitable trunk signaling method. Recognizer 2730 in recognition system 2700 starts listening to the remote communicant, searching for spoken digits (step 2920).

If the remote communicant telephone 2610 or the local communicant telephone 2620 are restored to on-hook, the telephone conversation content recognition system 2700 does not directly sense this. However, the on-hook state triggers the switch 2630 to disconnect the relevant channel in trunk 2640, which event is sensed by system 2700.

Referring to step 2920, three events may occur:

a. If recognizer 2730 recognizes a spoken digit (step 2930), it stores the digit in a temporary digit array in RAM 2820 and synthesizes an oral representation of a digit for confirming the recognized digit (step 2940). Alternatively, the audible confirmation may contain just a short beep. The recognizer returns to step 2920.

b. If recognizer 2730 recognizes spoken "no" or "clear" words (step 2950), uttered by remote communicant in response to digit confirmation to indicate that the last digit was an error, recognizer 2730 removes the last digit from the digit array and generates a "canceled" speech synthesis (step 2960). The recognizer returns to step 2920.

c. If recognizer 2730's inter-digit timer (not shown) expires (step 2970), or it receives a STOP command from processor 2740 due to a disconnect condition sensed by trunk interface 2710 (indicating an on-hook condition at link 2614 or link 2626), recognizer 2730 sends the recognized number (if any) to processor 2740, and stops listening (step 2980). Alternatively, the inter-digit timer may be omitted or may be set for a very long time period and the remote communicant may indicate, by means of a "stop" voice command, that all digits of the telephone number have been spoken. The processor 2740 stores the recognized number in the number memory 2750 along with the unique ID of the local communicant. The operation ends, and the recognizer 2730 is free to handle another telephone conversation.

Automatic dialing of the stored recognized telephone number is performed as follows:

a. The user lifts off the handset of the telephone 2620 and signals the switch 2630 to automatically dial the previously recognized and stored number. Signaling may be done by dialing a specific code, by depressing a specific key in a keypad of a cellular or mobile telephone, or by other suitable method.

b. Switch 2630 switches the call to recognition system 2700 via a channel within trunk 2640 which is termed herein a "incoming channel". The switch also sends to the recognition system 2700, via trunk 2640, the unique ID of the local communicant (e.g. her telephone number), by a suitable trunk signaling method.

c. Processor 2740 checks the number memory 2750 according to the unique ID of the user. If no telephone number has been recognized and stored for the requesting user, processor 2740 signals the switch 2630, which in turn generates a suitable error tone. Otherwise, processor 2740 dials, via a free channel of trunk 2640, termed herein the "outgoing channel" to a telephone number retrieved from number memory 2360. Processor 2740 commands trunk interface 2710 to connect the incoming channel to the outgoing channel via PCM bus 2720.

Alternatively, the recognition system 2700 sends the switch 2630 the requested number and transfers the call to the switch and the switch performs the call set up operation. Either way, the call which has been set up is conducted, unless a "busy" or "no-answer" signal is encountered.

It is appreciated that the embodiment of FIGS. 17–18 can be modified to store more than one telephone number per user, to manage lists of more than one telephone number, to record spoken telephone number-identifying titles, and to accept voice commands from the local communicant, all as described above with reference to the cellular or mobile telephone embodiment of FIGS. 1–8. The telephone number memory 2750 can be enlarged by using secondary memory devices like magnetic disks.

It is also appreciated that the system described in FIGS. 17–18 may be employed for additional tasks such as voice mail operations and interactive voice response operations, since the system's basic components (trunk interface, DSP unit, control processor and memory) are also capable of performing speech recording, playback and general purpose speech recognition and confirmation.

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

We claim:

1. A method for communicating telephone numbers from a remote communicant to a local communicant via a telephone connection, the method comprising:

receiving an oral rendition of a telephone number generated by a remote communicant;

recognizing a sequence of digits in an oral repetition of the telephone number generated by the local communicant; and storing said sequence of digits.

2. A method according to claim 1 and also comprising generating the oral rendition and the oral repetition in the course of a telephone conversation between said remote and local communicants.

3. A method according to claim 1 and also comprising retrieving said sequence of digits and automatically dialing the retrieved telephone number.

4. A method for communicating alphanumeric information from a remote communicant to a local communicant, the method comprising:

receiving an oral rendition of alphanumeric information generated by a remote communicant;

recognizing a sequence of alphanumeric data elements in an oral repetition of the alphanumeric information generated by the local communicant; and storing said sequence of alphanumeric data elements.

5. An accessory device for a telephone system, the device comprising:

a spoken telephone number recorder serving a local communicant, the recorder including:

a spoken telephone number recognizer operative to recognize a telephone number spoken in the course of a telephone conversation between a remote communicant and the local communicant; and a telephone number memory operative to store at least one telephone number received from said telephone number recognizer, and also comprising a spoken telephone number confirmation device operative to confirm the spoken telephone number in the course of the telephone conversation and, if the spoken telephone number is not positively confirmed, to correct the spoken telephone number in the course of the telephone conversation.

6. A system according to claim 5 and wherein said spoken telephone number confirmation device comprises:

apparatus for generating an oral representation, audible to at least one of said communicants in the course of the telephone conversation, of at least a portion of a telephone number recognized by said spoken telephone number recognizer; and apparatus operative upon receipt of an indication of incorrectness provided by at least one of said communicants, to delete at least a portion of the telephone number recognized by said recognizer and to reactivate said recognizer, thereby to provide the recognizer with an opportunity to recognize the portion of the telephone number as re-spoken by at least one of said communicants.

7. Telephone speech recognition apparatus operative in conjunction with a telephone channel connecting a remote communicant with a local communicant and including a remote-to-local audio channel and a local-to-remote audio channel, the apparatus comprising:

an interactive telephone speech recognizer operative, in the course of a telephone call between the local and remote communicants, to recognize at least a portion of speech conveyed over said telephone channel in the course of the telephone call and to convey to at least one of the remote and local communicants an audio signal based on said portion of said speech as recognized;

a first bidirectional communication path operative to convey audio signals from the remote communicant via the remote-to-local audio channel to the telephone speech recognizer and to the remote communicant from the telephone speech recognizer via the local-to-remote audio channel; and a second bidirectional communication path operative to convey audio signals from the local communicant via the local-to-remote audio channel to the telephone speech recognizer and to convey audio signals to the local communicant from the telephone speech recognizer via the remote-to-local audio channel.

8. Apparatus according to claim 7 wherein said telephone speech recognizer comprises:

an interactive confirming and correcting telephone speech recognizer operative to recognize, confirm and correct at least a portion of speech conveyed over said telephone channel in the course of the telephone call; and a memory operative to store information representing the portion of speech as recognized.

9. Apparatus according to claim 8 wherein said interactive confirming and correcting telephone speech recognizer is operative to confirm at least a portion of speech conveyed over said telephone channel by generating an oral equivalent of the information stored in the memory and presenting said oral equivalent to at least one of the communicants.

10. Apparatus according to claim 8 wherein said interactive confirming and correcting telephone speech recognizer is operative to confirm at least a portion of speech conveyed over said telephone channel by generating an oral equivalent of the information stored in the memory and presenting said oral equivalent to said remote communicant via said local-to-remote audio channel.

11. Apparatus according to claim 7 wherein said portion of speech comprises orally pronounced alphanumeric characters included in said speech.

12. Apparatus according to claim 11 wherein said alphanumeric characters comprise at least one telephone number.

13. Apparatus according to claim 8 wherein said interactive confirming and correcting telephone speech recognizer comprises a digit-by-digit interactive number confirmation device operative to recognize a sequence of digits uttered by a communicant and to recognize, convey back and correct as necessary each digit uttered by the communicant before the next digit is uttered.

* * * * *